United States Patent
Ooi

(10) Patent No.: US 10,401,948 B2
(45) Date of Patent: Sep. 3, 2019

(54) INFORMATION PROCESSING APPARATUS, AND INFORMATION PROCESSING METHOD TO OPERATE ON VIRTUAL OBJECT USING REAL OBJECT

(71) Applicant: SONY CORPORATION, Minato-ku (JP)

(72) Inventor: Kenichirou Ooi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 103 days.

(21) Appl. No.: 14/356,306

(22) PCT Filed: Jan. 29, 2013

(86) PCT No.: PCT/JP2013/000459
§ 371 (c)(1),
(2) Date: May 5, 2014

(87) PCT Pub. No.: WO2013/118457
PCT Pub. Date: Aug. 15, 2013

(65) Prior Publication Data
US 2015/0022444 A1    Jan. 22, 2015

(30) Foreign Application Priority Data
Feb. 6, 2012  (JP) ................. 2012-022707

(51) Int. Cl.
*G06F 3/01* (2006.01)
*G06F 3/03* (2006.01)
*G06K 9/00* (2006.01)

(52) U.S. Cl.
CPC .............. *G06F 3/011* (2013.01); *G06F 3/017* (2013.01); *G06F 3/0304* (2013.01); *G06K 9/00671* (2013.01)

(58) Field of Classification Search
CPC .............. G06T 19/006; G06T 7/70–75; G06K 9/00671; G06K 9/6211; G06F 3/011; G06F 3/017; G06F 3/0304
See application file for complete search history.

(56) References Cited

U.S. PATENT DOCUMENTS 5,838,326 A * 11/1998 Card .................. G06F 3/04815
715/775
5,917,490 A * 6/1999 Kuzunuki .............. G06F 3/017
715/775
(Continued)

FOREIGN PATENT DOCUMENTS

JP   2011-028309 A    2/2011
JP   2011-244058 A   12/2011
WO   WO 2011/119167 A2  9/2011

OTHER PUBLICATIONS

International Search Report dated May 10, 2013 in PCT/JP2013/000459.

*Primary Examiner* — Amare Mengistu
*Assistant Examiner* — Crystal Mathews
(74) *Attorney, Agent, or Firm* — Chip Law Group

(57) ABSTRACT

An information processing apparatus includes processing circuitry that is configured to issue a control command relating to a real object based on a displayed positional relationship between the real object and a predetermined object. The real object being a tangible, movable object and the predetermined object being at least one of another real object and a virtual object.

20 Claims, 19 Drawing Sheets

(56) References Cited

U.S. PATENT DOCUMENTS

| | | | | |
|---|---|---|---|---|
| 6,002,808 A * | 12/1999 | Freeman | G06F 3/017 | 348/171 |
| 6,118,887 A * | 9/2000 | Cosatto | G06T 382/103 | 382/103 |
| 6,373,968 B2 * | 4/2002 | Okano | G06K 9/033 | 382/117 |
| 6,738,631 B1 * | 5/2004 | Adler | G06K 9/00664 | 340/12.51 |
| 6,757,411 B2 * | 6/2004 | Chau | G06K 9/00067 | 340/5.83 |
| 6,771,294 B1 * | 8/2004 | Pulli | G06F 3/011 | 345/173 |
| 6,951,515 B2 * | 10/2005 | Ohshima | A63F 13/10 | 463/31 |
| 7,909,248 B1 * | 3/2011 | Goncalves | G07G 1/0063 | 235/375 |
| 8,427,424 B2 * | 4/2013 | Hartmann | G06F 3/0416 | 345/156 |
| 8,666,195 B1 * | 3/2014 | Mierle | G06K 9/6203 | 359/24 |
| 2001/0044858 A1 * | 11/2001 | Rekimoto | G06F 3/011 | 710/1 |
| 2003/0020707 A1 * | 1/2003 | Kangas | G06F 3/011 | 345/418 |
| 2003/0156756 A1 * | 8/2003 | Gokturk | G06F 3/017 | 382/190 |
| 2004/0113885 A1 * | 6/2004 | Genc | G06F 3/011 | 345/156 |
| 2006/0010400 A1 * | 1/2006 | Dehlin | G06F 3/0354 | 715/856 |
| 2007/0060336 A1 | 3/2007 | Marks et al. | | |
| 2008/0101715 A1 * | 5/2008 | Barnes | G06K 9/4671 | 382/264 |
| 2008/0170776 A1 * | 7/2008 | Albertson | G06F 21/35 | 382/154 |
| 2009/0300535 A1 | 12/2009 | Skourup et al. | | |
| 2010/0034457 A1 * | 2/2010 | Berliner | G06K 9/00362 | 382/154 |
| 2010/0098324 A1 * | 4/2010 | Fujieda | B25J 9/1697 | 382/154 |
| 2010/0156836 A1 | 6/2010 | Katayama | | |
| 2010/0208033 A1 * | 8/2010 | Edge | G06F 3/012 | 348/46 |
| 2010/0215271 A1 * | 8/2010 | Dariush | G06K 9/00369 | 382/180 |
| 2010/0260426 A1 * | 10/2010 | Huang | G06F 17/30247 | 382/218 |
| 2010/0310182 A1 * | 12/2010 | Kroepfl | G06K 9/00624 | 382/216 |
| 2011/0034244 A1 | 2/2011 | Marks et al. | | |
| 2011/0181497 A1 * | 7/2011 | Raviv | A63F 13/26 | 345/8 |
| 2011/0194731 A1 * | 8/2011 | BenHimane | G06K 9/6211 | 382/103 |
| 2011/0205242 A1 | 8/2011 | Friesen | | |
| 2011/0234631 A1 * | 9/2011 | Kim | G06T 15/60 | 345/632 |
| 2011/0234879 A1 | 9/2011 | Kashitani | | |
| 2011/0254765 A1 * | 10/2011 | Brand | G06F 3/017 | 345/158 |
| 2011/0255776 A1 | 10/2011 | Mark et al. | | |
| 2011/0267265 A1 * | 11/2011 | Stinson | G06F 3/017 | 345/157 |
| 2012/0002846 A1 * | 1/2012 | Yokoi | G06K 9/6265 | 382/115 |
| 2012/0011142 A1 * | 1/2012 | Baheti | G06K 9/4671 | 707/769 |
| 2012/0045093 A1 * | 2/2012 | Salminen | G06K 9/00295 | 382/103 |
| 2012/0087540 A1 * | 4/2012 | Chen | G06K 9/00335 | 382/103 |
| 2012/0089949 A1 * | 4/2012 | Chen | G06F 3/005 | 715/848 |
| 2012/0113140 A1 * | 5/2012 | Hilliges | G06F 3/011 | 345/633 |
| 2012/0113223 A1 * | 5/2012 | Hilliges | G06F 3/00 | 348/46 |
| 2012/0137259 A1 | 5/2012 | Campbell et al. | | |
| 2012/0146998 A1 * | 6/2012 | Kim | G06T 19/006 | 345/419 |
| 2012/0170800 A1 * | 7/2012 | da Silva Frazao | G06F 3/011 | 382/103 |
| 2012/0224060 A1 * | 9/2012 | Gurevich | B60R 1/00 | 348/148 |
| 2012/0263154 A1 * | 10/2012 | Blanchflower | G06F 17/30247 | 370/338 |
| 2012/0290257 A1 * | 11/2012 | Hodge | G06F 1/3206 | 702/151 |
| 2012/0306847 A1 * | 12/2012 | Lim | G06K 9/00744 | 345/418 |
| 2012/0317484 A1 * | 12/2012 | Gomez | G02B 27/017 | 715/716 |
| 2012/0319950 A1 | 12/2012 | Marks et al. | | |
| 2013/0002828 A1 * | 1/2013 | Ding | G02B 17/0836 | 348/49 |
| 2013/0044912 A1 * | 2/2013 | Kulkarni | G06K 9/00671 | 382/103 |
| 2013/0055120 A1 * | 2/2013 | Galor | G06F 3/017 | 715/764 |
| 2013/0061184 A1 * | 3/2013 | Guo | G03F 1/70 | 716/52 |
| 2013/0085345 A1 * | 4/2013 | Geisner | G06Q 30/00 | 600/300 |
| 2013/0093788 A1 * | 4/2013 | Liu | G06F 3/011 | 345/633 |
| 2013/0194164 A1 * | 8/2013 | Sugden | G02B 27/017 | 345/8 |
| 2013/0201185 A1 * | 8/2013 | Kochi | G06F 3/011 | 345/419 |
| 2013/0249944 A1 * | 9/2013 | Raghoebardayal | G06T 19/006 | 345/633 |
| 2013/0290233 A1 * | 10/2013 | Ferren | G06K 9/3266 | 706/46 |
| 2013/0342571 A1 * | 12/2013 | Kinnebrew | G06F 3/147 | 345/633 |
| 2014/0068526 A1 * | 3/2014 | Figelman | G06F 3/167 | 715/863 |
| 2014/0282162 A1 * | 9/2014 | Fein | G06F 3/0486 | 715/769 |

* cited by examiner

[Fig. 1]
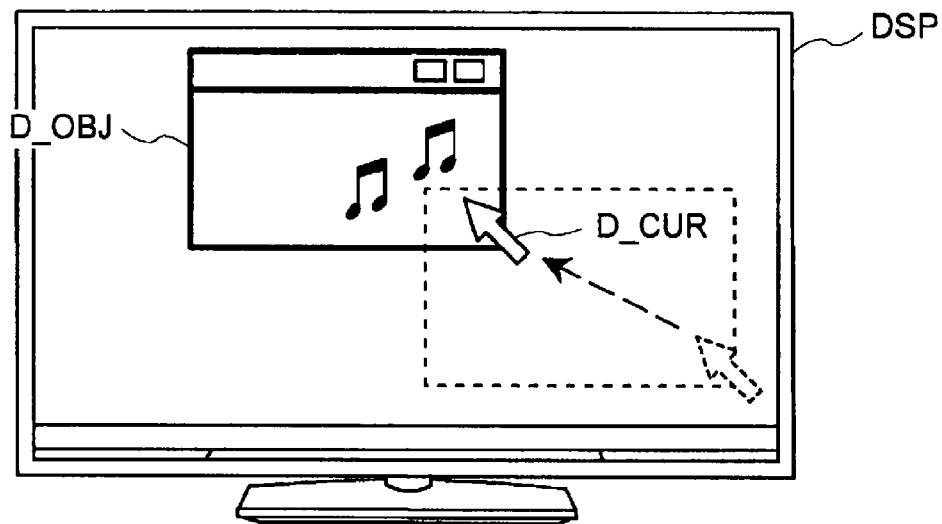
[Fig. 2]
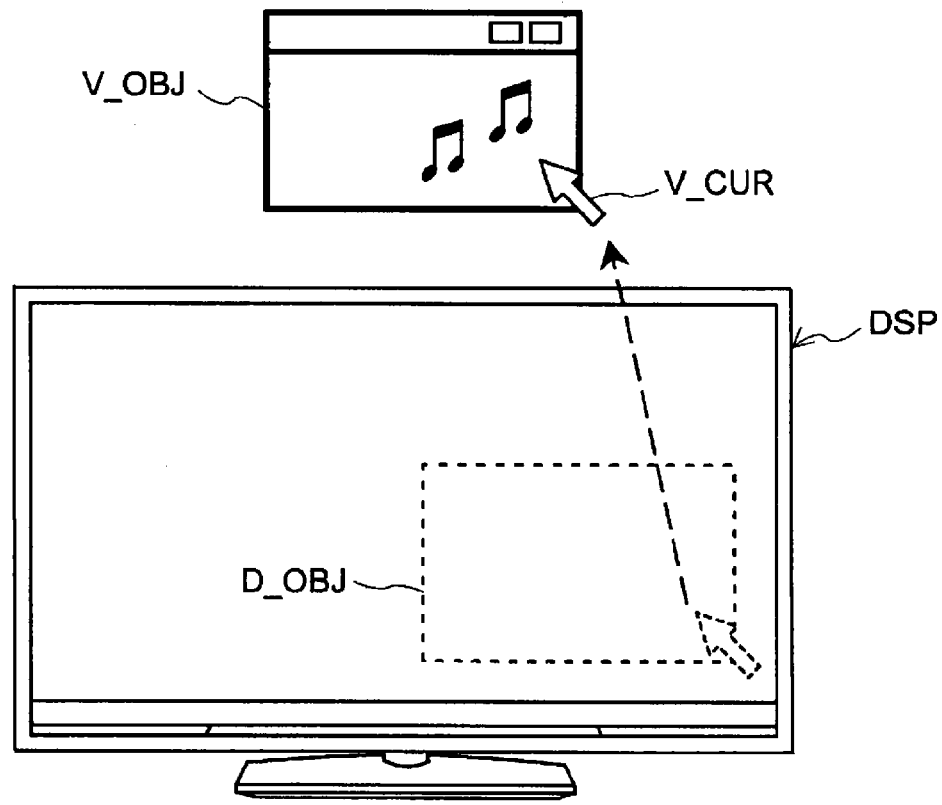

[Fig. 3]
(A) SUBJECT CAPTURED BY CA
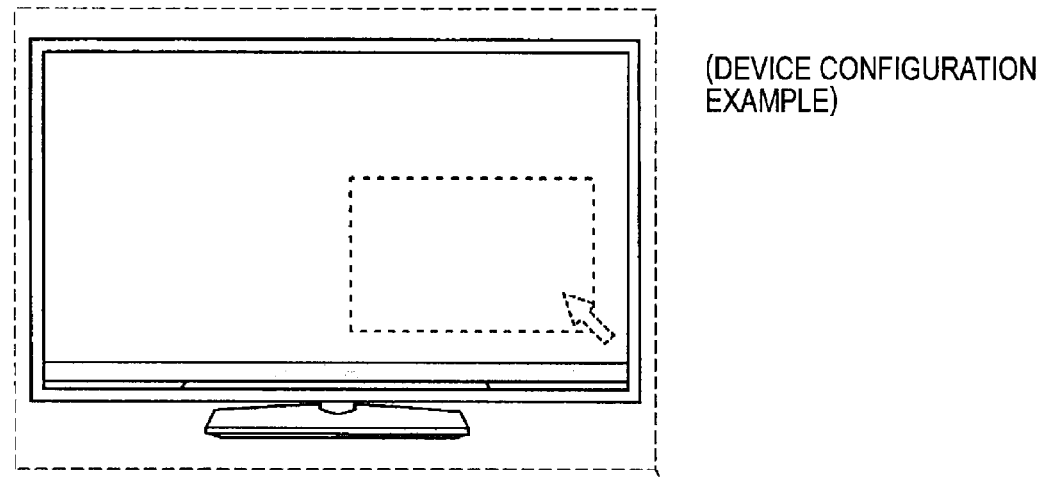
(DEVICE CONFIGURATION EXAMPLE)
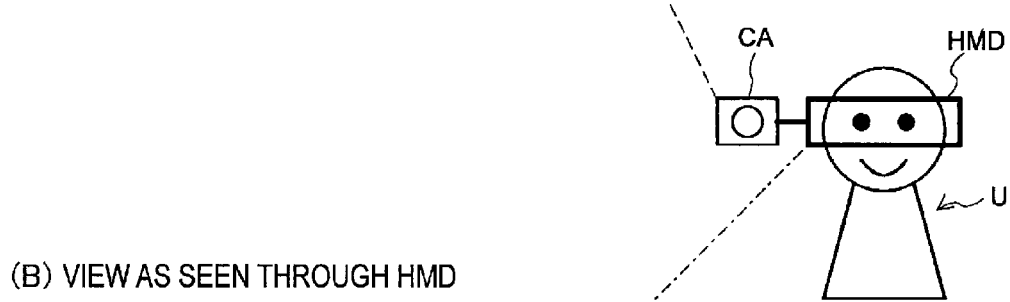
(B) VIEW AS SEEN THROUGH HMD
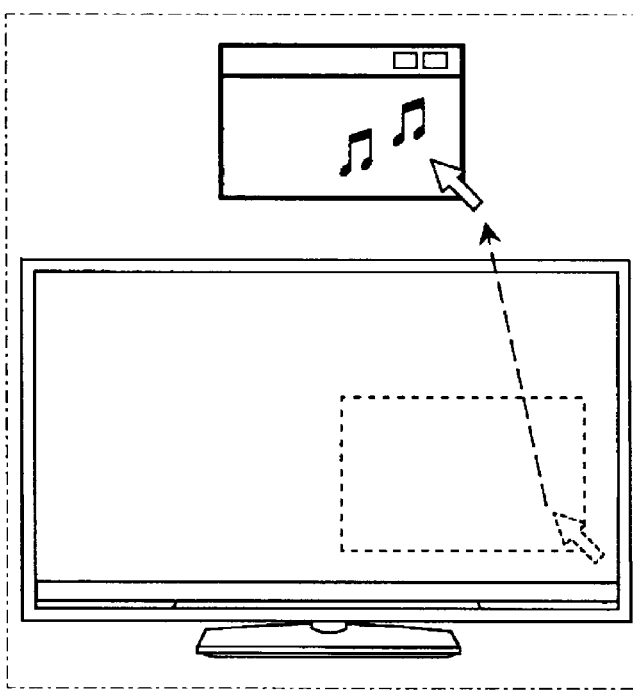

[Fig. 4]
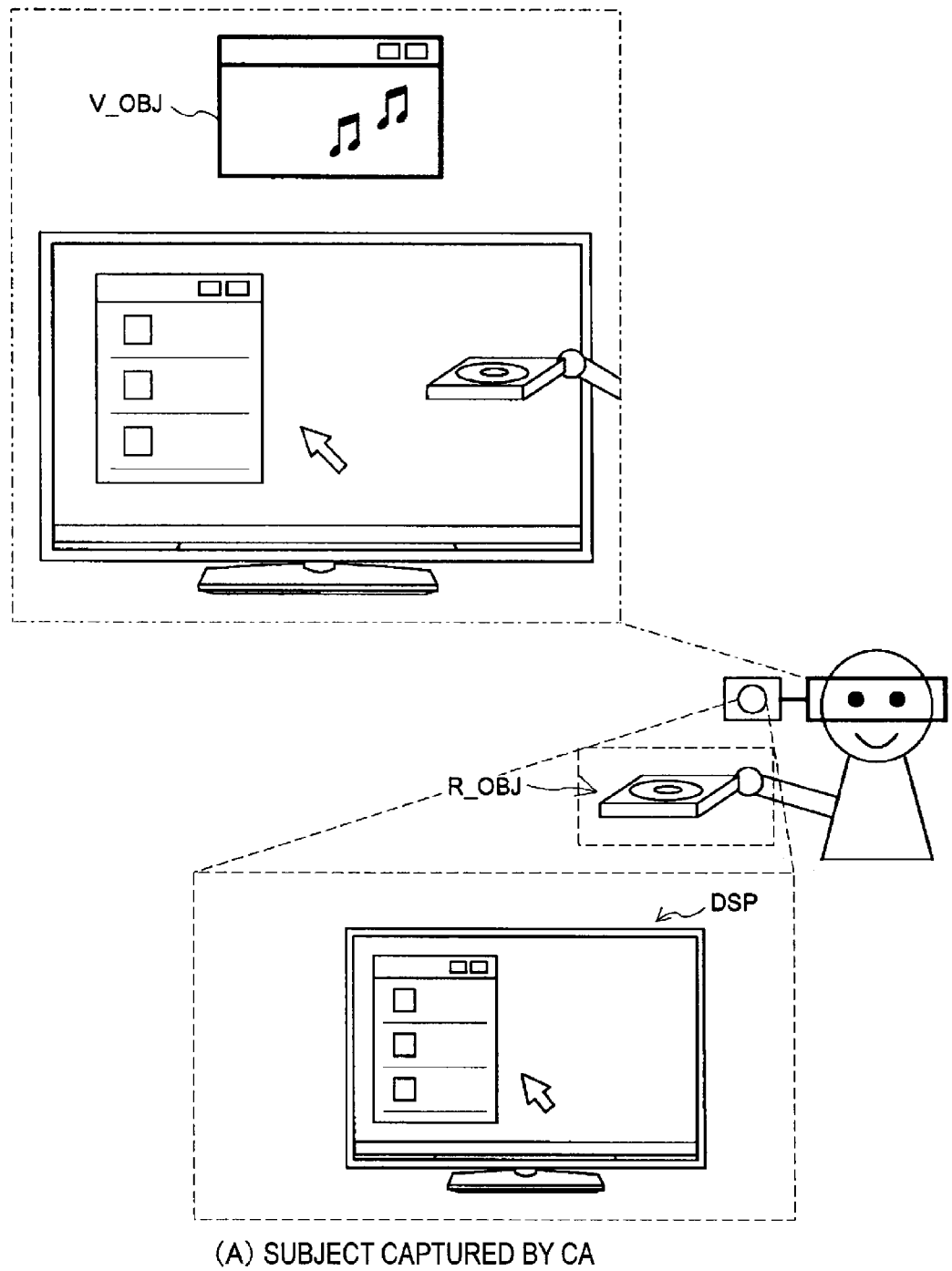

[Fig. 5]
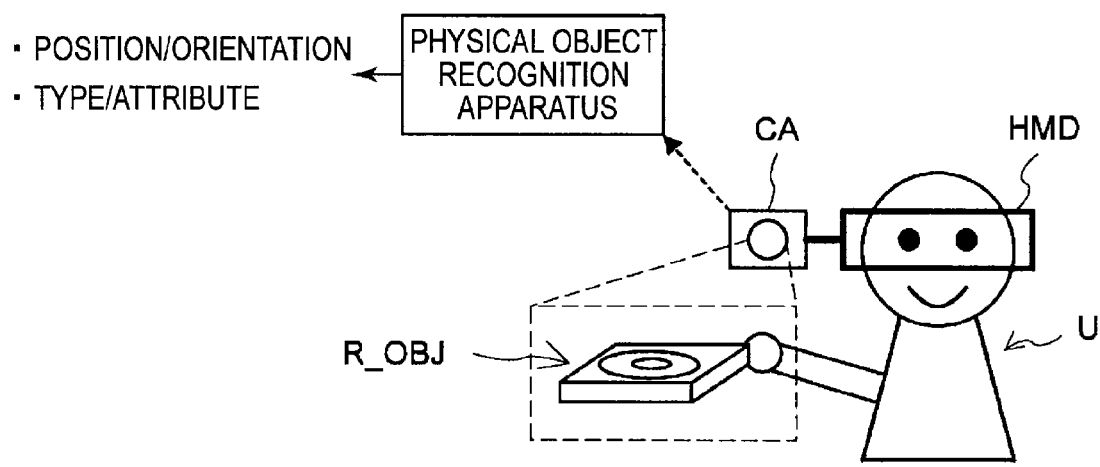

[Fig. 6]
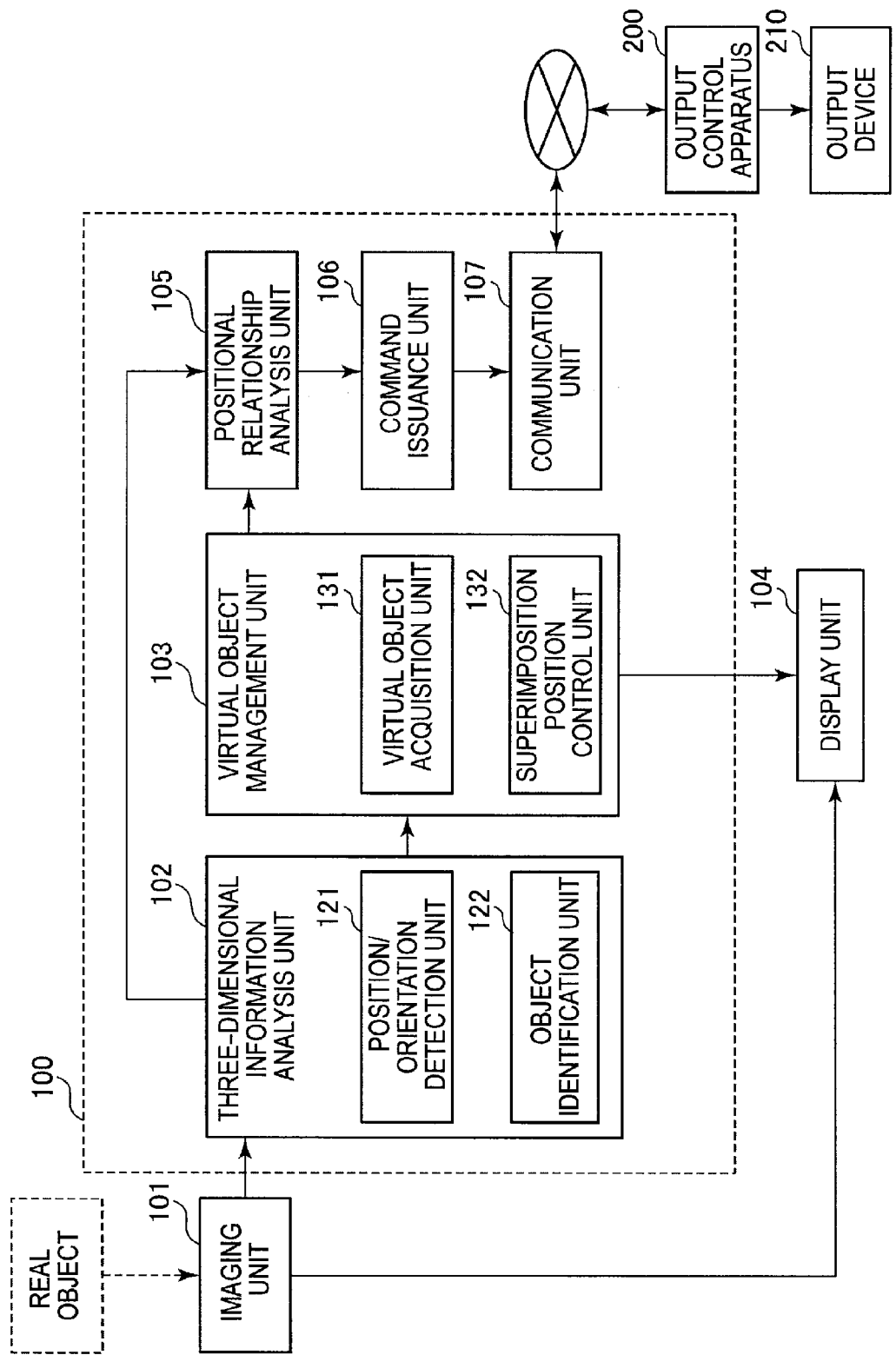

[Fig. 7]
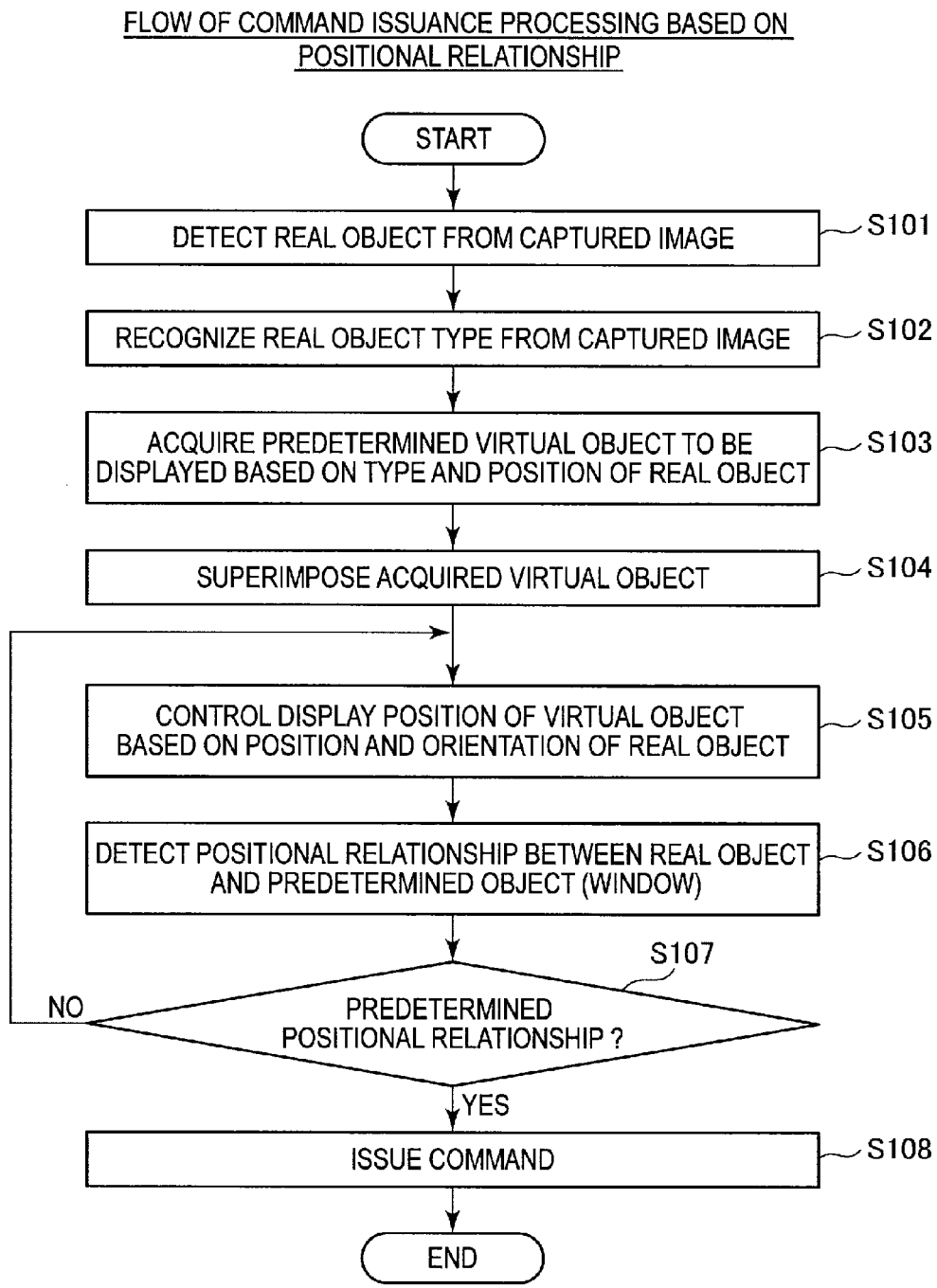

[Fig. 8]
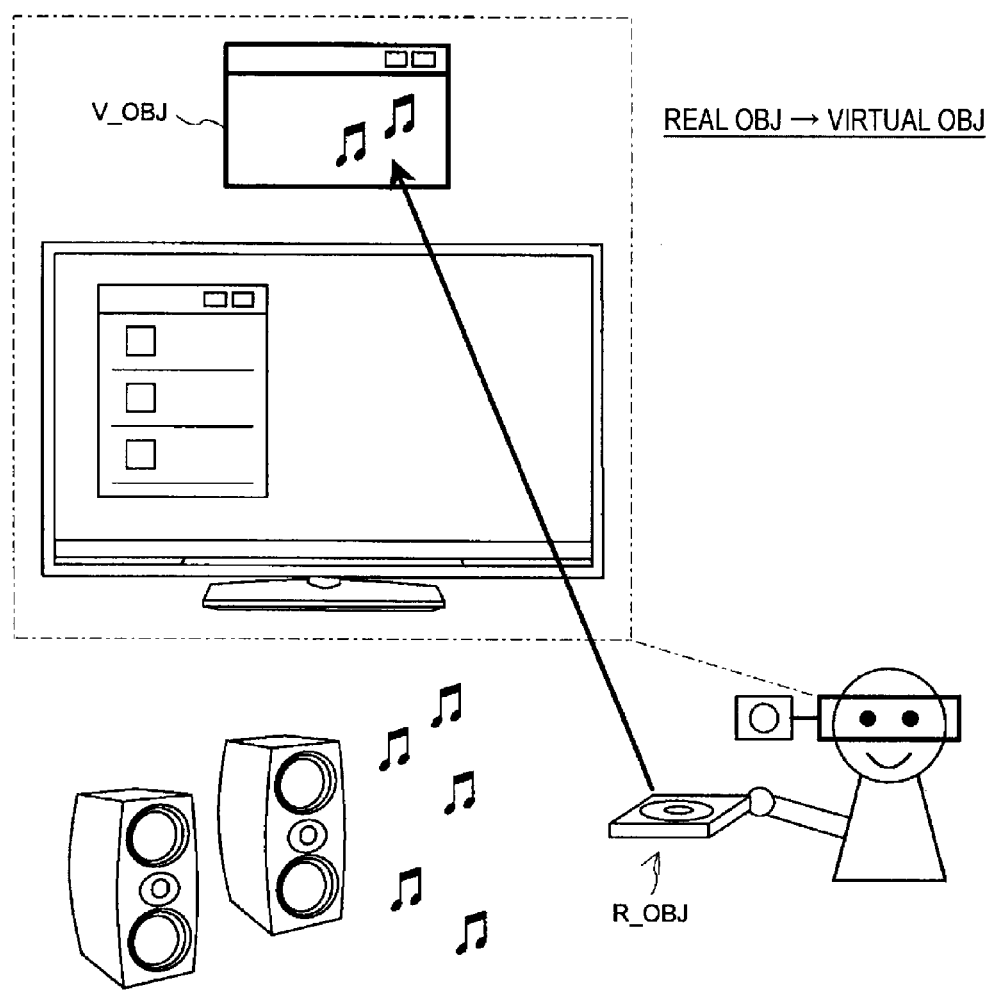

[Fig. 9]
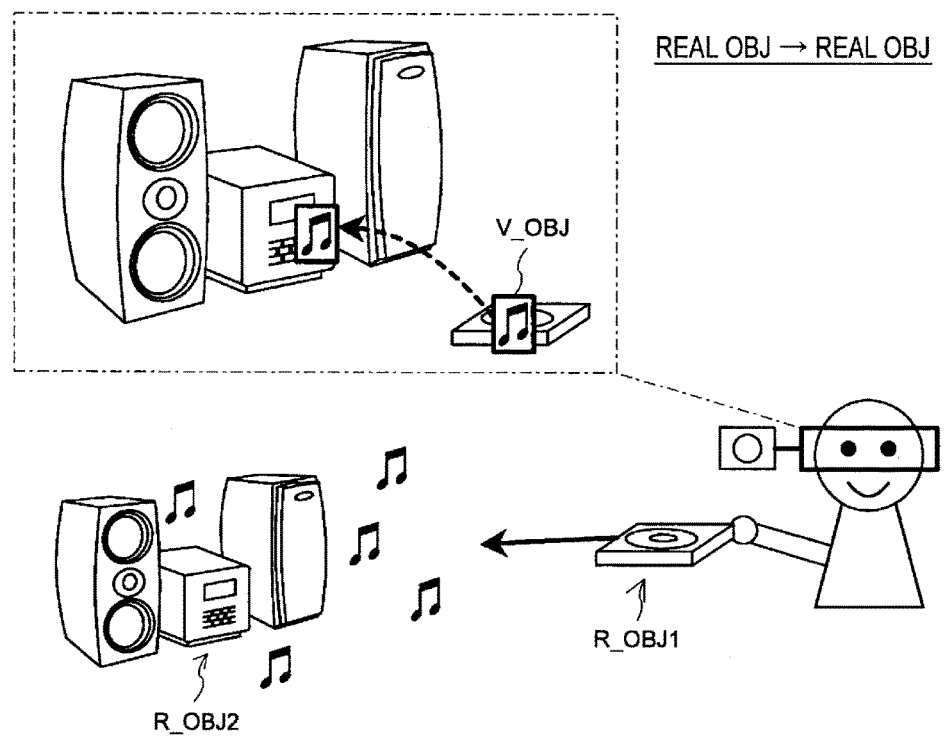

[Fig. 10]
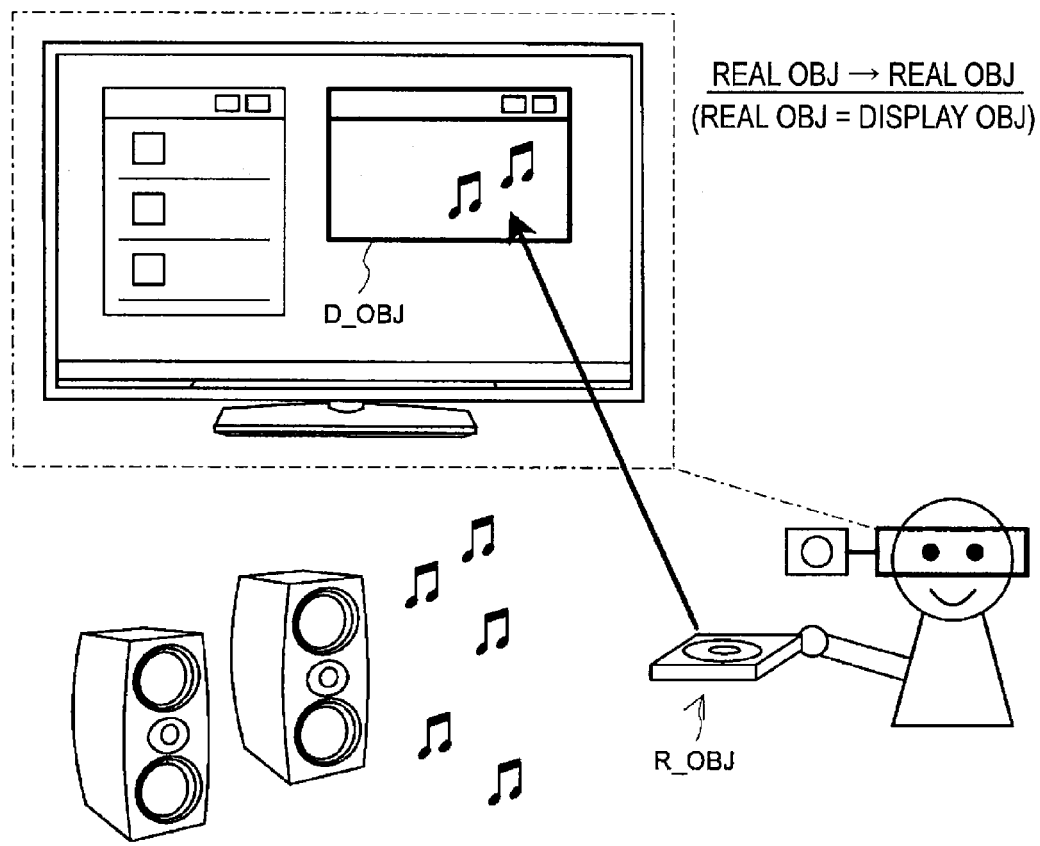

[Fig. 11]
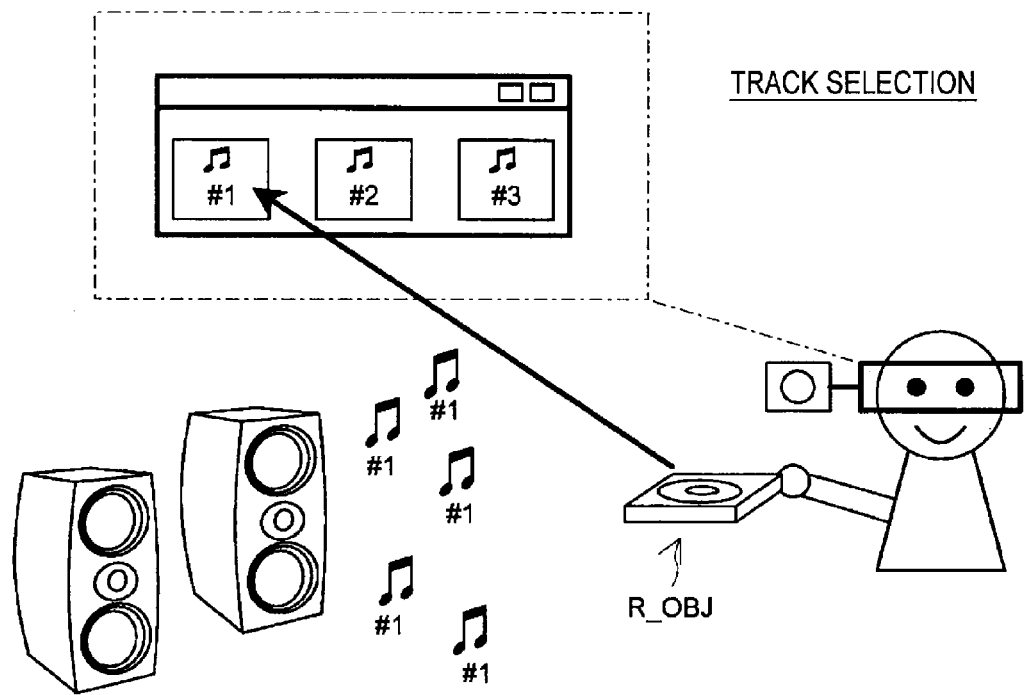
TRACK SELECTION
[Fig. 12]
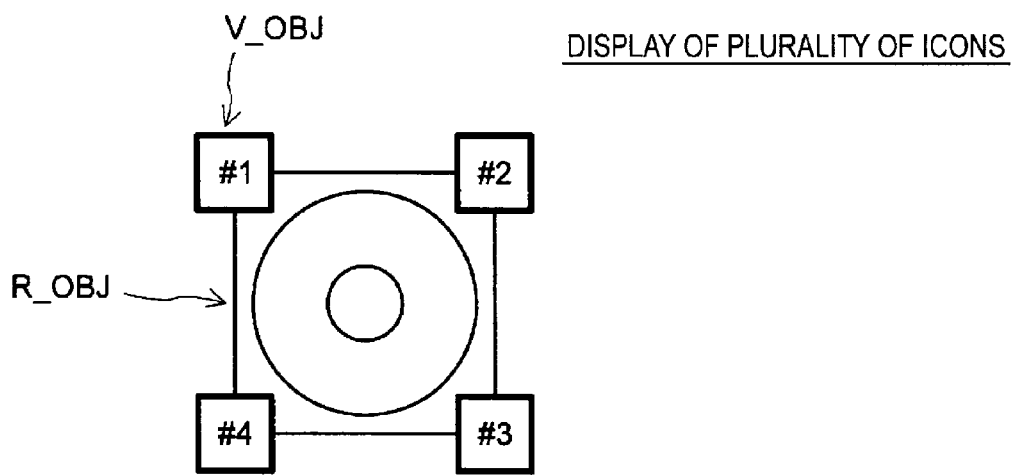
DISPLAY OF PLURALITY OF ICONS

[Fig. 13]
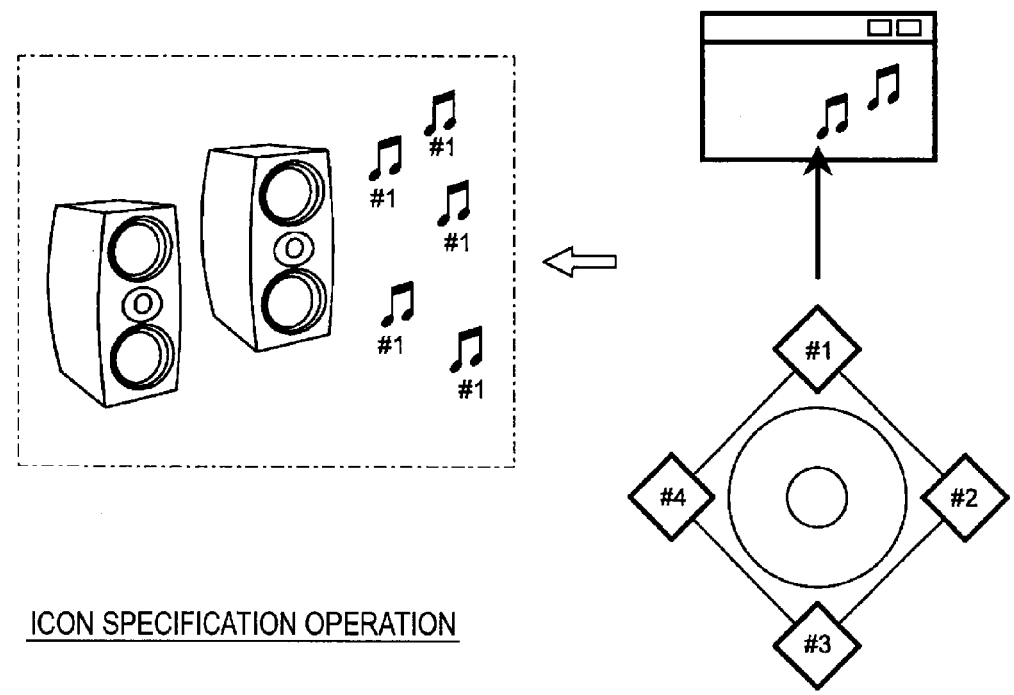
ICON SPECIFICATION OPERATION

[Fig. 14]
APPLIED EXAMPLE #1: BOOK READER
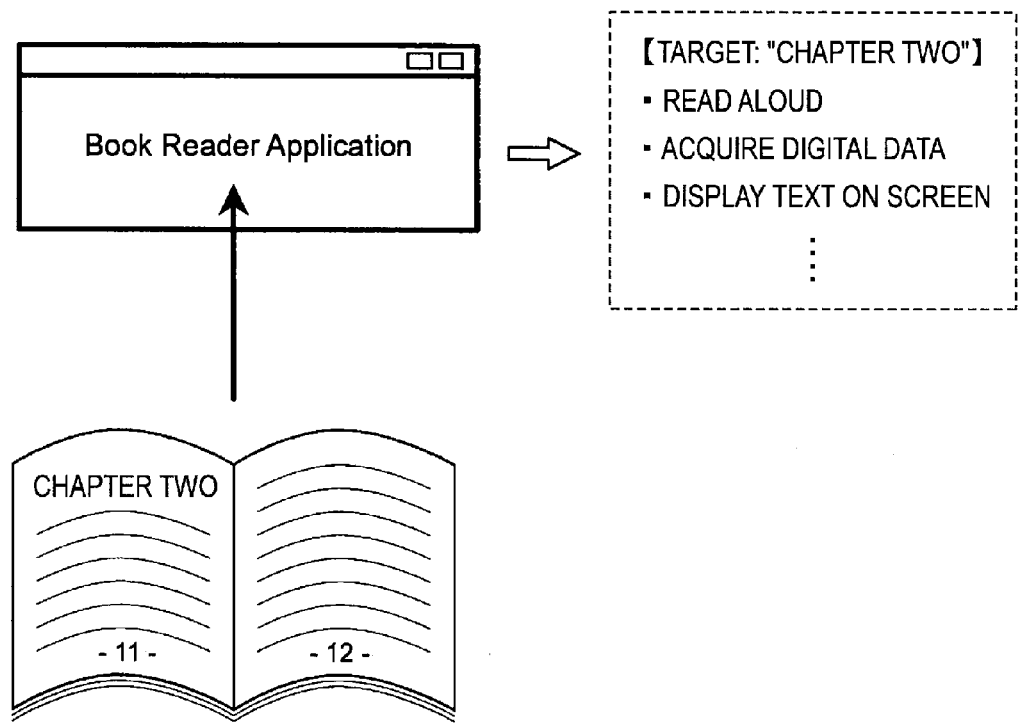

[Fig. 15]

OTHER APPLIED EXAMPLES

| OPERATION TARGET OBJECT | CONTROL TARGET CONTENT | DESTINATION OUTPUT | COMMAND (CONTROL CONTENT) |
|---|---|---|---|
| CD | SONG | AR MUSIC PLAYER | PLAY SONG |
| DVD | VIDEO | MEDIA PLAYER | PLAY VIDEO |
| DIGITAL CAMERA | PHOTOGRAPH | DIGITAL PHOTO FRAME | DISPLAY PHOTOGRAPH |
| BOOK | PASSAGE | SPEECH PROGRAM | RECITE |
| BOOK | PASSAGE | TEXT EDITOR | COPY & PASTE DOCUMENT |
| BOOK | PHOTOGRAPH | IMAGE EDITING SOFTWARE | COPY & PASTE PHOTOGRAPH |
| BUSINESS CARD | CONTACT INFORMATION | MOBILE PHONE, INFORMATION TERMINAL | RECORD CONTACT INFORMATION |
| FOOD ITEM | "PREFERRED FOOD" | AVATAR | GESTURE |
| ⋮ | ⋮ | ⋮ | ⋮ |

[Fig. 16]

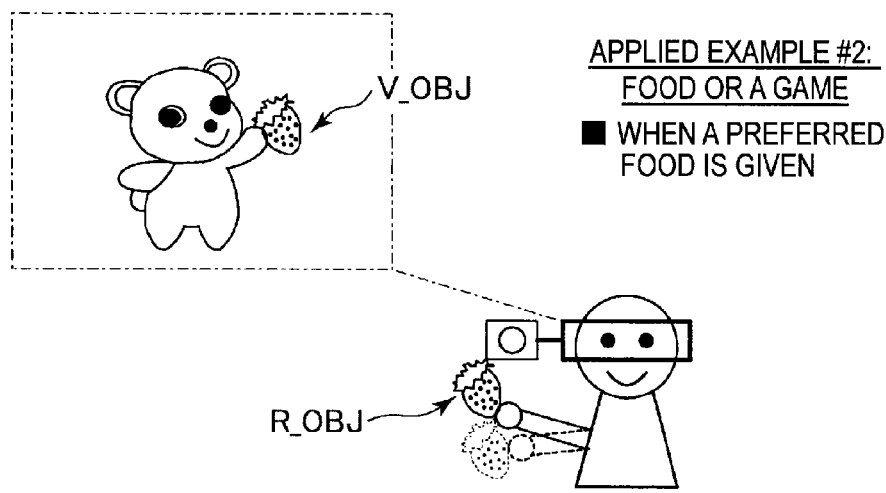

APPLIED EXAMPLE #2:
FOOD OR A GAME
■ WHEN A PREFERRED FOOD IS GIVEN

[Fig. 17]
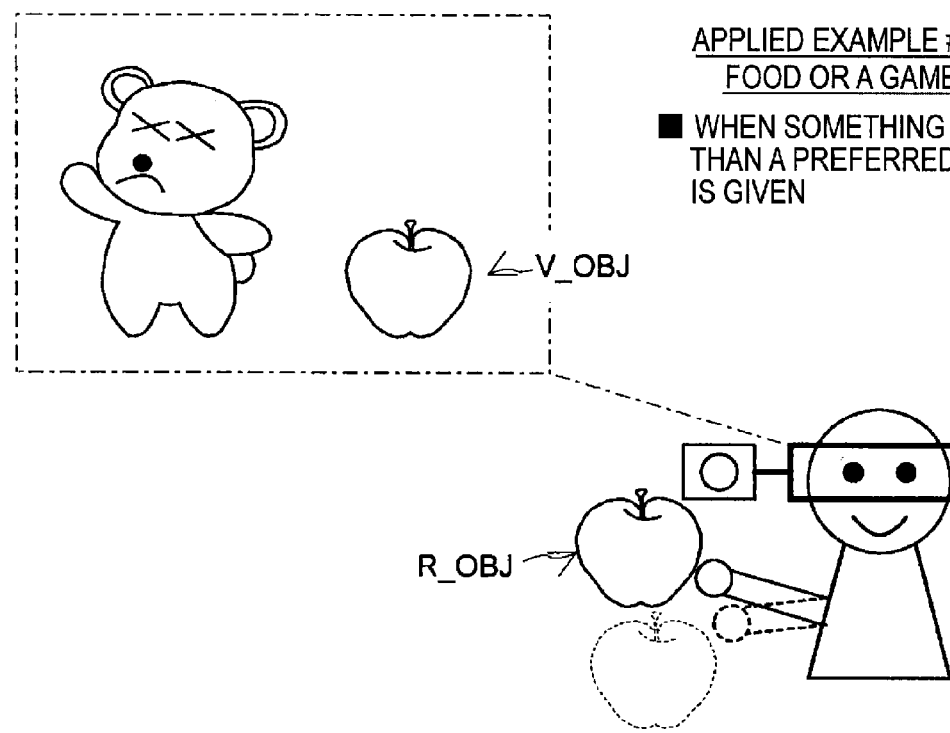

[Fig. 18]
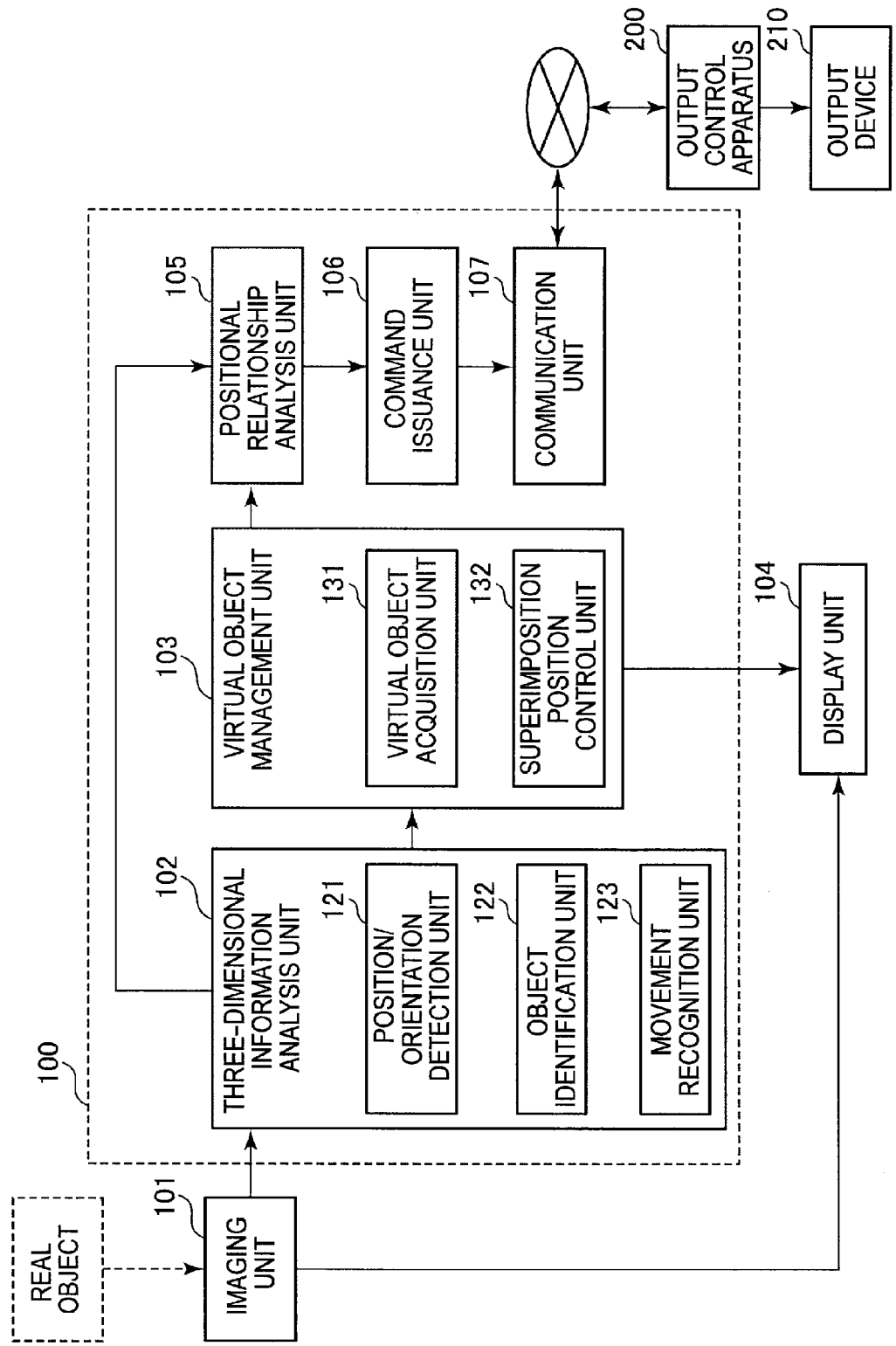

[Fig. 19]
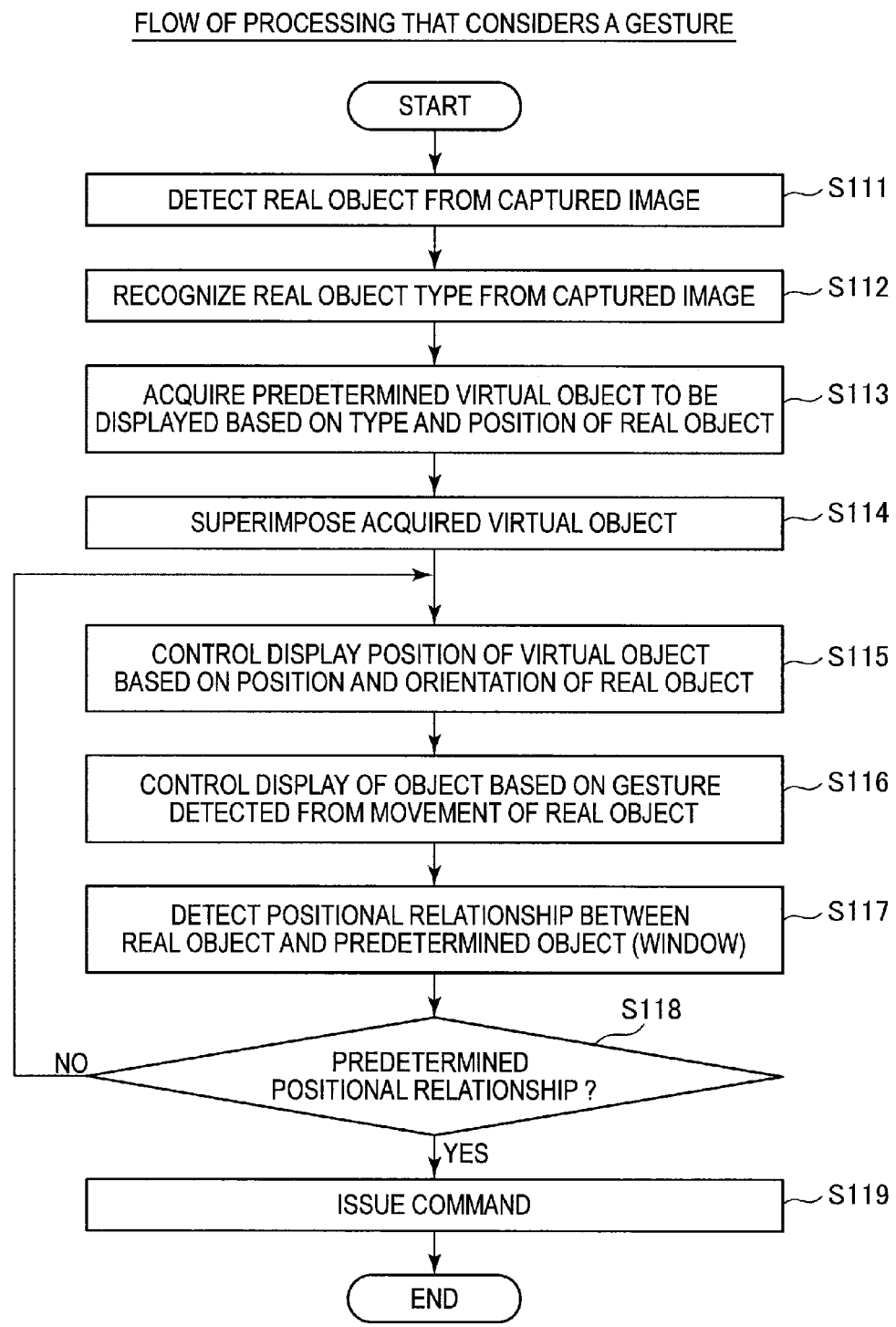

[Fig. 20]
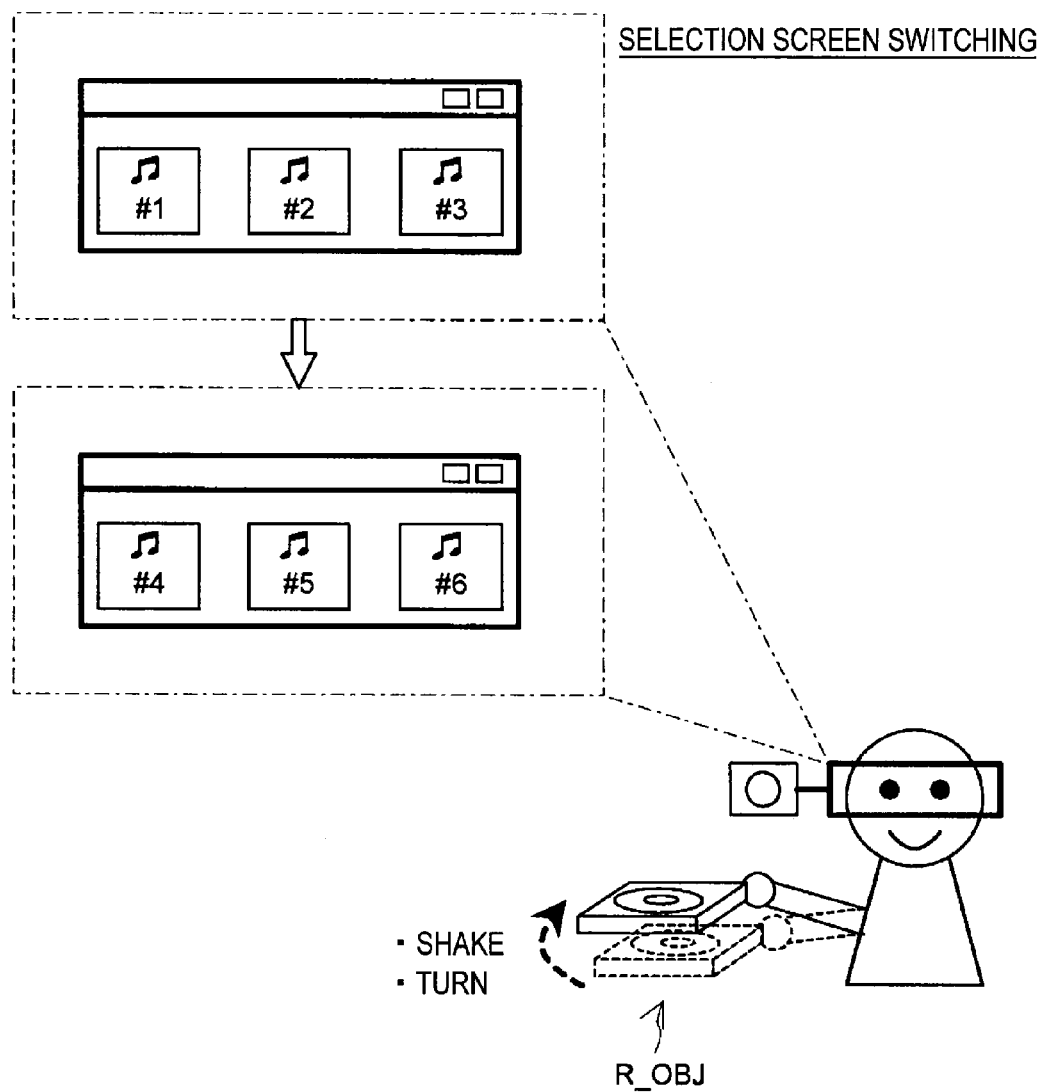

[Fig. 21]
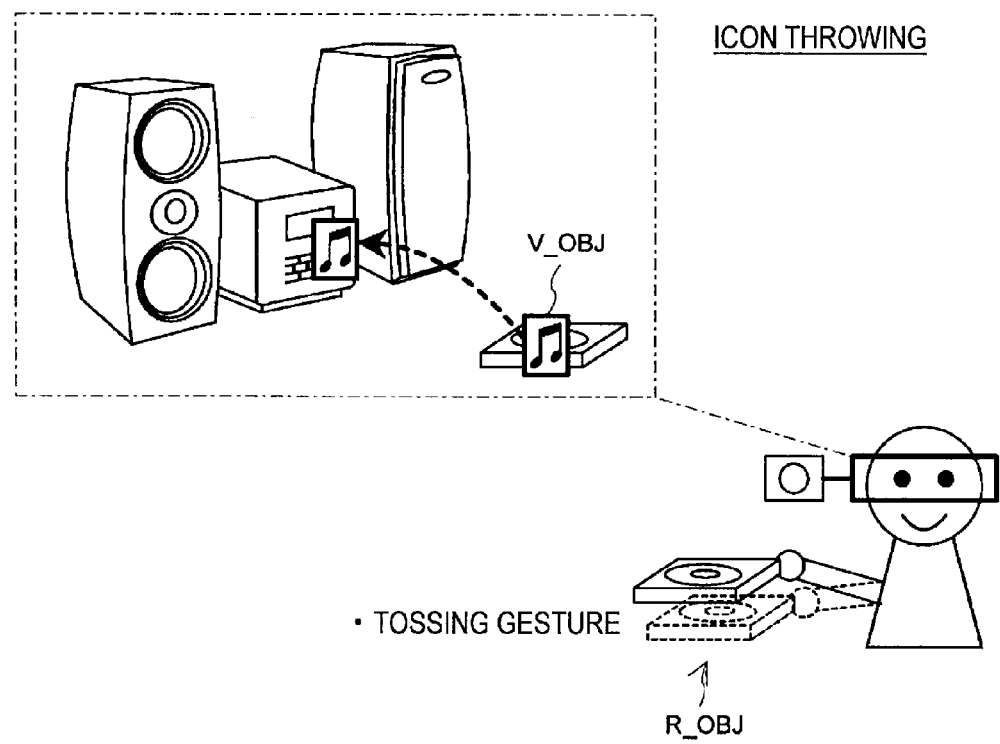

[Fig. 22]
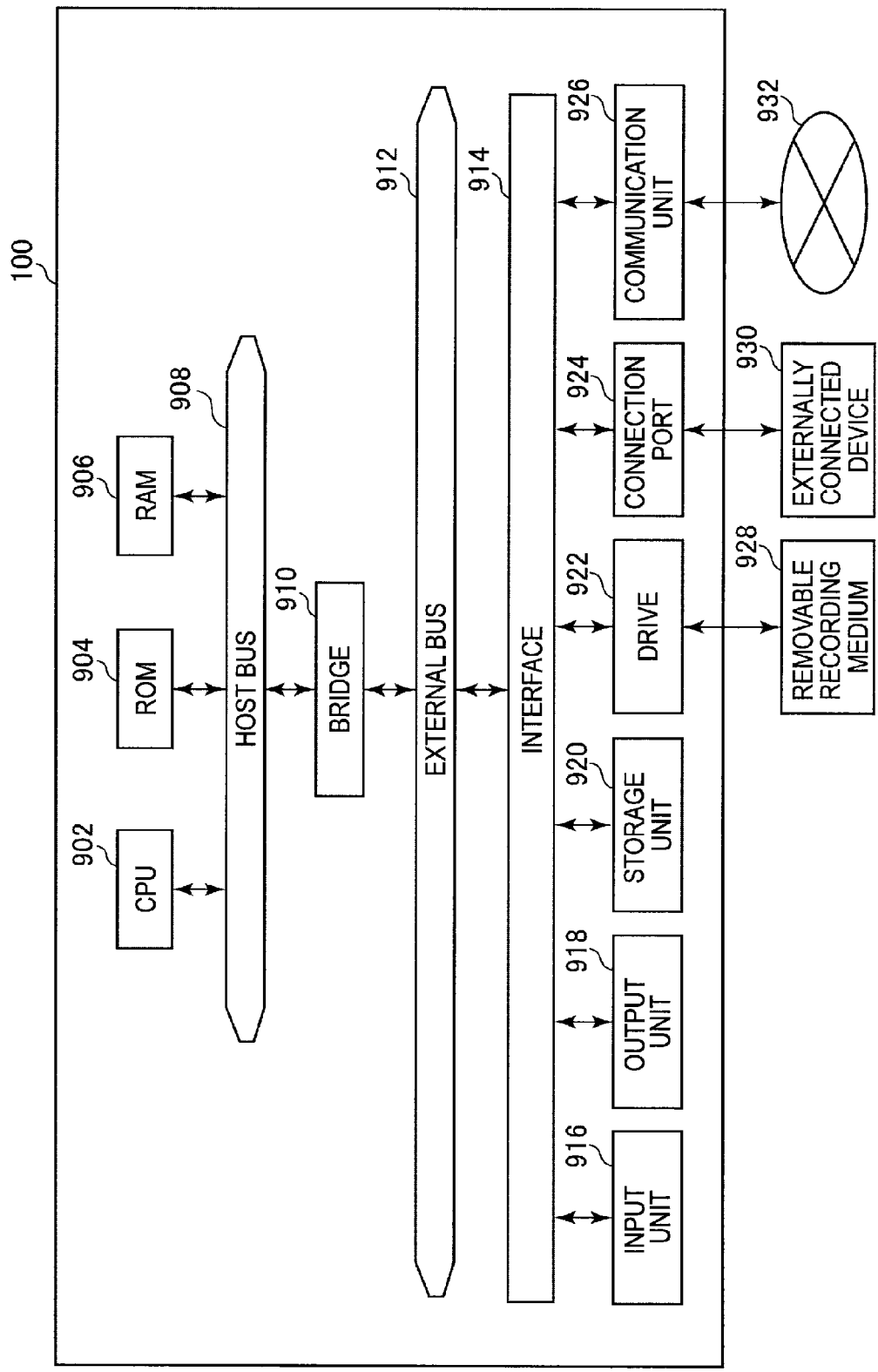

INFORMATION PROCESSING APPARATUS, AND INFORMATION PROCESSING METHOD TO OPERATE ON VIRTUAL OBJECT USING REAL OBJECT

TECHNICAL FIELD

The present disclosure relates to an information processing apparatus, and an information processing method.

BACKGROUND ART

Many technologies relating to AR (augmented reality), which expands the real world by superimposing over an image captured with an imaging apparatus information associated with that image, a target object included in the image and the like, have recently been disclosed.

For example, the below-described Patent Literature 1 discloses a technology for providing an image with a tag corresponding to the captured position and orientation of the image. Further, the below-described Patent Literature 2 discloses a technology relating to a user interface capable of effectively utilizing a spatial region beyond a display screen by utilizing mixed reality (MR) technology.

CITATION LIST

Patent Literature

PTL 1: JP 2011-244058A
PTL 2: JP 2011-28309A

SUMMARY

Technical Problem

However, the above literature does not disclose a method that allows a user to direct operate virtual information or a virtual object by utilizing a real object that exists in the real world. Therefore, the present technology, which was created in view of such circumstances, is directed to providing a novel and improved information processing apparatus, information processing method, and program that enable the direct operation of virtual information or a virtual object by utilizing a real object that exists in the real world.

Solution to Problem

An information processing apparatus includes processing circuitry that is configured to issue a control command relating to a real object based on a displayed positional relationship between the real object and a predetermined object. The real object being a tangible, movable object and the predetermined object being at least one of another real object and a virtual object.

Advantageous Effects of Invention

According to the present disclosure as described above, virtual information and a virtual object can be directly operated utilizing a real object that exists in the real world.

BRIEF DESCRIPTION OF DRAWINGS

FIG. 1 is an explanatory diagram illustrating an operation method using a user interface when MR is not utilized.

FIG. 2 is an explanatory diagram illustrating an operation method using a user interface in an AR virtual desktop application.

FIG. 3 is an explanatory diagram illustrating a configuration example of a device used for utilizing an AR virtual desktop application.

FIG. 4 is an explanatory diagram illustrating a configuration example of a device used for utilizing in an AR virtual desktop application.

FIG. 5 is an explanatory diagram illustrating a recognition method of a real object.

FIG. 6 is an explanatory diagram illustrating a function configuration of an information processing apparatus according to a first embodiment.

FIG. 7 is a flowchart illustrating an example of a command issuance processing flow according to the first embodiment.

FIG. 8 is an explanatory diagram illustrating command issuance processing based on a positional relationship between a real object and a virtual object.

FIG. 9 is an explanatory diagram illustrating command issuance processing based on a positional relationship among a plurality of real objects.

FIG. 10 is an explanatory diagram illustrating command issuance processing based on a positional relationship between a real object and a display object.

FIG. 11 is an explanatory diagram illustrating a method for selecting a desired song from among a plurality of songs.

FIG. 12 is an explanatory diagram illustrating a display example of a plurality of virtual objects.

FIG. 13 is an explanatory diagram illustrating an operation method utilizing a plurality of virtual objects.

FIG. 14 is an explanatory diagram illustrating an applied example of the technology according to the first embodiment.

FIG. 15 is an explanatory diagram illustrating an applied example of the technology according to the first embodiment.

FIG. 16 is an explanatory diagram illustrating an applied example of the technology according to the first embodiment.

FIG. 17 is an explanatory diagram illustrating an applied example of the technology according to the first embodiment.

FIG. 18 is an explanatory diagram illustrating a function configuration of an information processing apparatus according to a second embodiment.

FIG. 19 is a flowchart illustrating an example of a command issuance processing flow according to the second embodiment.

FIG. 20 is an explanatory diagram illustrating a selection screen switching method utilizing gestures.

FIG. 21 is an explanatory diagram illustrating an execution operation method utilizing gestures.

FIG. 22 is an explanatory diagram illustrating a hardware configuration capable of executing the functions of the information processing apparatus according to the present disclosure.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be carried out in the following order.
1: Introduction
1-1 Regarding the AR Virtual Desktop Application
1-2 Regarding Physical Object Recognition Technology
2: First Embodiment (User Interface Utilizing Positional Relationship Between Objects)
2-1: System Configuration Example
2-2: Configuration of Information Processing Apparatus 100
2-3: Operation of Information Processing Apparatus 100
2-4: Regarding the Operation Method
2-5: Applied Examples
3: Second Embodiment (Operation Interface that Considers Gestures)
3-1: System Configuration Example
3-2: Configuration of Information Processing Apparatus 100
3-3: Operation of Information Processing Apparatus 100
3-4: Regarding the Operation Method
4: Hardware Configuration Example
5: Summary 1: Introduction First, we will introduce the technology relating to the present embodiment.

1-1: Regarding the AR Virtual Desktop Application

First, as an example of the technology relating to the present embodiment, we will introduce an AR virtual desktop application. This technology relates to a user interface capable of effectively utilizing a spatial region beyond a display screen by utilizing mixed reality (MR) technology. This technology will now be briefly described with reference to FIGS. 1 to 4.

FIG. 1 is an explanatory diagram illustrating an operation method using a normal user interface (i.e., when MR is not utilized). On the other hand, FIG. 2 is an explanatory diagram illustrating an operation method using a user interface in an AR virtual desktop application (i.e., when MR is utilized). Further, FIG. 3 is an explanatory diagram illustrating a configuration example of a device used for utilizing an AR virtual desktop application.

For a normal user interface that does not utilize MR, as illustrated in FIG. 1, the user can move a display mouse cursor D_CUR displayed on a display screen of a display apparatus DSP within the display screen by operating a mouse.

The user moves the display mouse cursor D_CUR onto a display object D_OBJ displayed on a display screen of the display apparatus DSP by operating the mouse. Then, the user specifies the display mouse cursor D_CUR by performing a predetermined mouse operation, and by moving the mouse can move the specified object within the display screen of the display apparatus DSP.

However, if the display mouse cursor D_CUR or the display object D_OBJ is positioned on the edge of the display apparatus DSP display screen, the display mouse cursor D_CUR cannot be moved beyond the display screen even if the user moves the mouse in a direction that moves the display mouse cursor D_CUR even further toward the outside.

On the other hand, for a user interface in an AR virtual desktop application that utilizes MR, as illustrated in FIG. 2, a virtual mouse cursor V_CUR and a virtual object V_OBJ are displayed beyond the display screen of the display apparatus DSP.

In the present disclosure, the term "virtual object" refers to an object visible to the user that is displayed based on MR technology on a head-mounted display (HMD) worn by the user. However, a virtual object is not captured by an imaging apparatus. In contrast, a real object (one that is tangible) that exists in the real world and a display object displayed on the display apparatus DSP can be captured by an imaging apparatus.

Further, similar to a normal user interface, the display mouse cursor D_CUR and the display object D_OBJ are displayed within the display screen of the display apparatus DSP. The display of the display mouse cursor D_CUR and the display object D_OBJ has continuity with the display of the virtual mouse cursor V_CUR and the virtual object V_OBJ. As illustrated in FIG. 2, when the display mouse cursor D_CUR and the display object D_OBJ are moved beyond the display apparatus DSP, the virtual mouse cursor V_CUR and the virtual object V_OBJ are displayed beyond the display apparatus DSP.

Thus, for a user interface in an AR virtual desktop application, since a spatial region beyond the display apparatus DSP is utilized, convenience is high.

An AR virtual desktop application like that described above which utilizes MR technology is realized by a device configuration such as that illustrated in FIG. 3, for example. As illustrated in FIG. 3, a user U utilizes a camera CA and a head-mounted display HMD. Note that a device including functions equivalent to these may also be used. For example, since a device such a camera-equipped mobile phone or smartphone includes an image capturing function and a display function, such a device can be utilized instead of the configuration illustrated in FIG. 3. However, to facilitate the following description, we will proceed using an example in which the configuration combines a camera CA and a head-mounted display HMD.

The head-mounted display HMD displays an image of a target object captured by the camera CA. In addition, the head-mounted display HMD superimposes the virtual mouse cursor V_CUR and the virtual object V_OBJ over this image of the target object. In the example illustrated in FIG. 3, a virtual application window is displayed as the virtual object V_OBJ on the head-mounted display HMD. The camera CA is provided in the head-mounted display HMD pointing in the direction of the user's line of sight.

In the AR virtual desktop application, the position of the real object (a mouse cursor etc.) that is operated by the user U is used to determine the position of the virtual object V_OBJ that is displayed superimposed over the captured image. Consequently, the user needs to master in advance the operation procedure of the user interface that utilizes a mouse cursor and the like. Obviously, when performing some kind of operation, the mouse cursor, for example, needs to be moved.

For example, when playing music content, the user has to perform the playback operation by searching through folders stored by a music content data file, and select the desired music content with the mouse. In this case, the user needs to know in advance the location where virtual information such as the content file is. Such an operation is just expanding the desktop, despite the fact that an environment capable of utilizing a virtual space exists. Namely, such an operation cannot be said to be fully utilizing MR technology.

Therefore, the present inventor conceived of realizing an intuitive user interface by utilizing for operations an article different to an operation device, such as a mouse, in order to effectively harness MR technology. Specifically, as illustrated in FIG. 4, the present inventor thought of a technique which, rather than selecting a music content data file when playing music content, utilizes the actual compact disc (CD) that the user is trying to play as the operation target to enable the music content corresponding to that CD to be played. Obviously, this technique is not limited to music content, and can be applied to video content, a book reader and the like.

To embody the above idea in a concrete manner, technology (hereinafter referred to as "physical object recognition technology") for recognizing the position, movement, type, attributes and the like of the article, such as an actual CD, is necessary. Accordingly, before describing the technology relating to the present embodiment in detail, we will discuss physical object recognition technology. Note that in the following description, the article such as an actual CD etc. is also referred to as a "real object". This example of a real object is movable, as well as portable (easily carried by a user).

1-2 Regarding Physical Object Recognition Technology

As illustrated in FIG. 5, physical object recognition technology is performed by recognizing with a physical object recognition apparatus the position, orientation, shape, type and the like of a real object included in a captured image based on an image captured by the camera CA mounted on the user. A known example of physical object recognition technology used by a physical object recognition apparatus is "Speeded-Up Robust Features (SURF)".

SURF is a technology that selects a characteristic point from various real objects included in a captured image, and detects both the position of the selected characteristic point and the position and the orientation of the camera. The basic processing of SURF is described in, for example, "H. Bay, A. Ess, T. Tuytelaars and L. V. Gool, "Speeded-Up Robust Features (SURF)", Computer Vision-ECCV (2006)".

By applying SURF or some other technology, the shape, orientation, position, type and the like of the real object can be recognized. For example, as illustrated in FIG. 5, if the user has a CD case in his/her hand, and that CD case is in the imaging range of the camera, the shape and the like of the CD case can be recognized using the above-described physical object recognition technology based on an image captured by the camera. Further, by utilizing this recognition result, the positional relationship between a physical object in the real world (in this case, the CD case) and a real object or a virtual object can be detected.

In the above, we introduced the technology relating to the present embodiment. Although for ease of description we described an example of a head-mounted device having an HMD and a camera, the applied scope of the technology according to the present embodiment is not limited to this.

2: First Embodiment (User Interface Utilizing Positional Relationship Between Objects)

A first embodiment of the present technology will now be described. The first embodiment relates to the configuration of a user interface that utilizes a positional relationship between objects. Particularly, the present embodiment relates to a technique for realizing an intuitive user interface that utilizes a real object such as a CD case.

2-1: System Configuration Example

First, a configuration example of a system capable of realizing the technology according to the first embodiment will be described. This system is configured from, for example, an imaging unit 101, an information processing apparatus 100, a display unit 104, an output control apparatus 200, and an output device 210. However, the information processing apparatus 100 may be integrally formed with the imaging unit 101 and the display unit 104. Further, the output device 210 may be an audio output device that outputs audio, or a display device that displays an image. In addition, some or all of the functions of the information processing apparatus 100 may be realized by a cloud computing system. In the following, the description will focus on the configuration of the information processing apparatus 100.

2-2: Configuration of Information Processing Apparatus 100 (FIG. 6)

The configuration of the information processing apparatus 100 according to the first embodiment will be described with reference to FIG. 6. FIG. 6 is an explanatory diagram illustrating a function configuration of the information processing apparatus 100. As illustrated in FIG. 6, the information processing apparatus 100 mainly includes an imaging unit 101, a three-dimensional information analysis unit 102, a virtual object management unit 103, a display unit 104, a positional relationship analysis unit 105, a command issuance unit 106, and a communication unit 107.

The imaging unit 101 includes, for example, a lens for collecting light incident from a real object and an image sensor for generating an electric signal based on the amount of received light. The imaging unit 101, which captures an image of a real object, may be, for example, the camera CA provided on the HMD worn by the user.

Examples of image sensors that can be utilized include a CCD image sensor and a CMOS image sensor. The imaging unit 101 captures an images of a real object, and outputs the captured image to the three-dimensional information analysis unit 102 and the display unit 104.

The three-dimensional information analysis unit 102 analyzes three-dimensional information included in the captured image input from the imaging unit 101. The three-dimensional information analysis unit 102 includes a position/orientation detection unit 121 and an object identification unit 122.

The position/orientation detection unit 121 in the three-dimensional information analysis unit 102 analyzes the captured image of the input real object, and detects the position and orientation in three-dimensional space of the real object. The detection method may be carried out using the above-described SURF technology, for example. The position/orientation detection unit 121 outputs the position and the orientation of the detected real object to the virtual object management unit 103.

The object identification unit 122 in the three-dimensional information analysis unit 102 analyzes the captured image of the input real object, and identifies an ID of the real object.

The object identification unit 122 detects, for example, the position of one or a plurality of characteristic points from the captured image of the input real object. Further, the object identification unit 122 matches the position of a characteristic point of the input real object with the position of a characteristic point of a plurality of real objects that is stored in a (not illustrated) storage unit, such as a memory.

This storage unit stores, for each of a plurality of real objects, an ID of these real objects and the position of each characteristic point. The object identification unit 122 sets the ID of the real object having the characteristic point whose distance from the characteristic point of the input real object is the shortest from among the plurality of real objects for which characteristics points are stored in the storage unit as the ID for the input real object. The characteristic point is, for example, a point located on the circumference of a polygonal square or circle. The object identification unit 122 outputs the identified real object ID to the virtual object management unit 103.

The virtual object management unit 103 acquires the virtual object corresponding to the real object and controls the position where this virtual object will be superimposed based on the ID and the position of the identified real object. Further, the virtual object management unit 103 includes a virtual object acquisition unit 131 and a superimposition position control unit 132.

The virtual object acquisition unit 131 acquires display information about the virtual object corresponding to the ID of the identified real object from a database, for example, pre-stored in a memory or other such storage unit. For example, if the input real object is identified as a CD, as the corresponding virtual object, an icon having the shape of a musical note may be acquired from the database. The virtual object acquisition unit 131 outputs the acquired virtual object display information to the display unit 104 and the positional relationship analysis unit 105.

The superimposition position control unit 132 controls the position where the virtual object acquired by the virtual object acquisition unit 131 will be superimposed based on the position and the orientation of the detected real object. For example, the superimposition position control unit 132 calculates the position of the center of the CD, which is the detected real object, and superimposes the virtual object over the calculated position. The superimposition position control unit 132 outputs the position where the virtual object is to be superimposed to the display unit 104 and the positional relationship analysis unit 105.

The display unit 104 superimposes the virtual object input from the virtual object management unit 103 over the captured image that includes the real object.

The capturing of an image of the real object by the imaging unit 101, the three-dimensional information analysis of the captured image by the three-dimensional information analysis unit 102, and the acquisition and position control of the virtual object by the virtual object management unit 103 are performed in real time. Consequently, if the user moves the real object, the virtual object corresponding to that real object also moves so as to follow the real object.

The positional relationship analysis unit 105 analyzes the positional relationship between a given real object included in an image captured by the imaging unit 101 (hereinafter, "real object A") and a predetermined object other than object A (hereinafter, "object B"). We will now consider an example in which object A is a CD, and object B is an application window for CD playback.

Object B, which here is an application window for CD playback for example, may be a display object displayed on a display device (e.g., the display apparatus DSP illustrated in FIG. 4 etc.) or a virtual object displayed on the display unit 104, such as an HMD. However, in this example the position of object B does not follow the position of object A.

If object B is a display object such as an application window displayed by a display device, the real object A and object B are included in the image captured by the imaging unit 101. This captured image is analyzed by the three-dimensional information analysis unit 102, whereby the position and orientation of the real object A and the position and orientation of the display object B are detected. The positional relationship analysis unit 105 analyzes the positional relationship between the real object A and the display object B that were analyzed by the three-dimensional information analysis unit 102.

On the other hand, if object B is a virtual object such as a virtual application window, for example, the superimposition position control unit 132 controls the position and orientation of object B without any regard to the position and orientation of real object A captured by the imaging unit 101. The superimposition position control unit 132 may also control the position and orientation of object B based on the initial position and orientation of the real object A captured by the imaging unit 101.

If object B is a virtual object, the positional relationship analysis unit 105 analyzes the positional relationship between the real object A analyzed by the three-dimensional information analysis unit 102 and the virtual object B controlled by the virtual object management unit 103.

The positional relationship analysis unit 105 outputs a signal regarding whether real object A and object B are in a predetermined positional relationship, such as being close, to the command issuance unit 106.

More specifically, the positional relationship analysis unit 105 calculates the distance in three-dimensional space between real object A and object B. If the calculated distance is equal to or less than a predetermined threshold, the positional relationship analysis unit 105 determines that real object A and object B are close, and outputs a predetermined electric signal to the command issuance unit 106. Further, the calculation of the distance between real object A and object B may be carried out by considering only the distance in a predetermined direction.

However, when calculating the distance in three-dimensional space between real object A and object B, if object B is a display object, coordinates based on the display plane of the display device have to be converted into three-dimensional space coordinates. For example, for coordinates based on the display plane of the display device, one corner of the display screen in the display device serves as the origin. Further, one side of the two sides forming this corner is taken as the x axis, and the other side as the y axis.

If a signal indicating that real object A and object B are in a predetermined positional relationship is input from the positional relationship analysis unit 105, the command issuance unit 106 issues a predetermined command relating to real object A. Further, this predetermined command may relate to real object A and also relate to object B.

For example, if real object A is a CD, when this CD is brought near the application window for CD playback (object B), the command issuance unit 106 issues a command to perform CD playback.

Here, the information processing apparatus 100 is connected to the output control apparatus 200 via a wired or wireless network. The issued command is transmitted to the output control apparatus 200 via the communication unit 107. The output control apparatus 200 controls the output device 210 by executing the received command. The output device 210 may be an audio playback device, a video playback device and the like.

The output control apparatus 200 may be a part of the information processing apparatus 100. In this case, the communication unit 107 is removed from the configuration of the information processing apparatus 100 illustrated in FIG. 6, so that commands are directly transmitted to the output control apparatus 200 from the command issuance unit 106.

In the above, we mainly described the configuration of the information processing apparatus 100.

2-3: Operation of Information Processing Apparatus 100 (FIG. 7)

Next, operation of the information processing apparatus 100 according to the first embodiment will be described with reference to FIG. 7. FIG. 7 is a flowchart illustrating operation of the information processing apparatus 100 according to the first embodiment.

As illustrated in FIG. 7, first, the information processing apparatus 100 detects a real object from a captured image (S101). At this stage, the information processing apparatus 100 detects the position and orientation of the real object. Then, the information processing apparatus 100 recognizes the type of the real object from the captured image (S102). Next, the information processing apparatus 100 acquires a predetermined virtual object to be displayed in a virtual space based on the type, position etc. of the real object (S103). For example, if the real object is a CD case, the information processing apparatus 100 acquires a music player screen or an icon marked by a musical note as the virtual object.

Next, the information processing apparatus 100 displays and superimposes the virtual object acquired in step S103 (S104). For example, the information processing apparatus 100 displays the music player screen in a virtual space, or superimposes an icon marked by a musical note over the CD case. Then, the information processing apparatus 100 controls the display position of the virtual object based on the position and orientation of the real object (S105). For example, if the user has brought the CD case close to the music player screen, the information processing apparatus 100 moves the icon superimposed over the CD case so as to follow the movement of the CD case.

Next, the information processing apparatus 100 detects the positional relationship between the real object and a predetermined object (e.g., a music player screen etc., or a window) (S106). Then, the information processing apparatus 100 determines whether the positional relationship detected in step S106 satisfies the predetermined positional relationship (S107). For example, the information processing apparatus 100 determines whether the real object and the predetermined object are in contact, or determines whether the distance between the real object and the predetermined object is equal to or less than a predetermined distance.

If the real object and the predetermined object are in a predetermined positional relationship, the processing proceeds to step S108. On the other hand, if the real object and the predetermined object are not in a predetermined positional relationship, the processing returns to step S105. If the processing has proceeded to step S108, the information processing apparatus 100 issues a pre-set command based on the type of the real object, the type of the predetermined object, or the positional relationship (S108), and then ends the series of processes relating to command issuance processing. Specific examples of the respective objects, specific examples of the commands, and the specific operation method will be described below.

In the above, operation of the information processing apparatus 100 according to the first embodiment was described. Although the flow of the basic processing executed when issuing a command based on a positional relationship was described, optionally, some of the processing steps may be interchanged or modified. Further, the respective operation methods described below that apply the basic processing flow described here can configure an executable user interface.

2-4: Regarding the Operation Method

Next, an example of a user interface and an operation method thereof that can be executed using the functions of the information processing apparatus 100 according to the first embodiment will be described with reference to FIGS. 8 to 12.

(Operation for Bringing a Real Object Close to a Virtual Object (Window) (FIG. 8))

First, an operation method for bringing a real object close to a virtual object (window) will be described with reference to FIG. 8. FIG. 8 is an explanatory diagram illustrating command issuance processing based on a positional relationship between a real object and a virtual object. As illustrated in FIG. 8, a user wearing an HMD provided with a camera CA can move a CD to a desired position as a real object R_OBJ.

Further, the HMD worn by the user superimposes an image (reference image, or reference scene) captured by the camera CA (which is included by the display device in the example illustrated in FIG. 8), and displays a virtual object V_OBJ in part of an augmented reality scene. In the example illustrated in FIG. 8, as the virtual object V_OBJ, an application window for CD playback corresponding to the CD, which is the real object R_OBJ, is displayed.

The user can recognize the positional relationship between the real object R_OBJ and the virtual object V_OBJ by looking at the screen displayed on the HMD.

The user moves the CD, which is the real object R_OBJ, to bring it close to the application window, which is the virtual object V_OBJ. At this point, the real object R_OBJ is captured by the imaging unit 101, and its position is analyzed by the three-dimensional information analysis unit 102. Further, the positional relationship analysis unit 105 detects that the real object R_OBJ and the virtual object V_OBJ have been brought close together, and outputs a predetermined signal.

When the signal indicating that the real object R_OBJ and the virtual object V_OBJ have been brought close together is output from the positional relationship analysis unit 105, a predetermined command is issued from the command issuance unit 106.

In the example illustrated in FIG. 8, a command for performing playback of a song included on the CD is issued as the predetermined command, and the song included on the CD is played from a speaker, which is the output device 210.

Thus, by directly operating the real object R_OBJ, the user can play a song included on a CD just by changing the positional relationship between a virtual object V_OBJ displayed on an HMD and the real object R_OBJ. Consequently, the user does not need to master a complex operation method for issuing a predetermined command. Further, the user also does not need to search for the song's data file. In addition, since the operation is carried out utilizing an actual object, the operation itself is very intuitive.

(Operation for Bringing a Real Object Close to Another Real Object+Icon Operation (FIG. 9))

Next, an operation method for bringing a real object close to another real object (in the example illustrated in FIG. 9, a CD player) will be described with reference to FIG. 9. FIG. 9 is an explanatory diagram illustrating command issuance processing based on a positional relationship between a real object and another real object. As illustrated in FIG. 9, a user wearing an HMD provided with a camera CA can move the CD to a desired position as a real object R_OBJ1.

Further, the HMD worn by the user superimposes an image captured by the camera CA (which is included by the display device in the example illustrated in FIG. 9), and displays a virtual object V_OBJ. In the example illustrated in FIG. 9, as a virtual object V_OBJ, a musical note icon corresponding to the CD, which is the real object R_OBJ1, is displayed.

The user can recognize the positional relationship between the real object R_OBJ1 and the virtual object V_OBJ by looking at the screen displayed on the HMD.

The user moves the CD, which is the real object R_OBJ1, to bring it close to the CD player, which is a real object V_OBJ2. At this point, the CD serving as the real object R_OBJ1 is captured by the imaging unit 101, and its position is analyzed by the three-dimensional information analysis unit 102. Further, the positional relationship analysis unit 105 detects that CD serving as the real object R_OBJ1 has been brought close to the CD player serving as the real object V_OBJ2, and outputs a predetermined signal.

When the signal indicating that the CD serving as the real object R_OBJ1 and the CD player serving as the real object V_OBJ2 have been brought close together is output from the positional relationship analysis unit 105, a predetermined command is issued from the command issuance unit 106. In the example illustrated in FIG. 9, a command for performing playback of a song included on the CD is issued as the predetermined command, and the song included on the CD is played from a speaker, which is the output device 210.

However, if a song is suddenly played when a CD and a CD player are in a predetermined positional relationship, the user may feel uneasy or surprised. Thus, although a user interface that gives rise to sudden feelings may be interesting, it can cause feelings of discomfort. Therefore, the method can be configured so that, as illustrated in FIG. 9, for example, when the CD and the CD player are in a predetermined positional relationship, the virtual object V_OBJ jumps toward the CD player from the CD. Further, the method can be configured so that the song is played at a timing when the virtual object V_OBJ that has jumped out reaches the CD player. By applying such a method, because the timing can be visually recognized, a user interface is realized that alleviates the user's feeling of discomfort and allows for easier operation.

Thus, by directly operating a real object R_OBJ, the user can play a song included on a CD. Consequently, the user does not need to master a complex operation method for issuing a predetermined command. Further, the user also does not need to search for the song's data file. In addition, since the operation is carried out utilizing an actual object, the operation itself is very intuitive. Moreover, by also using a virtual object V_OBJ, a user interface is realized that can be easily operated by the user.

(Operation for Bringing a Real Object Close to Another Real Object (Display Object) (FIG. 10))

In the example illustrated in FIG. 8, an example of a user interface for playing a song by bringing a real object R_OBJ close to a virtual object V_OBJ was described. However, as illustrated in FIG. 10, a display object D_OBJ can be used instead of the virtual object V_OBJ. In this case too, playback of a song is executed based on a positional relationship between objects by essentially the same processing as the processing flow described with reference to FIG. 8. Note that since the display object D_OBJ is a display object captured by the camera CA, it is an example of a real object R_OBJ.

(Method for Selecting a Track Based on an Operation for Bringing a Real Object Close (FIG. 11))

Up to this point we have described a user interface for playing a song on a CD, which is an example of a real object R_OBJ, by bringing the CD close to an object (a CD player, a window etc.) serving as a target. However, there may be cases in which the user wants to play songs by specifying the respective tracks included on the CD. Therefore, FIG. 11 proposes a user interface that enables the user to select and play one desired track from among a plurality of tracks.

For example, as illustrated in FIG. 11, a window displaying an icon that represents a plurality of tracks (e.g., plurality of parts, such as video or audio tracks) is displayed so that the user can play a song corresponding to a track that he/she has brought the real object R_OBJ close to. Note that although the point of considering the positional relationship between the icon representing the respective tracks and the real object R_OBJ is different, the processing performed after a track has been selected is essentially the same as the processing flow described with reference to FIG. 8 and the like. Applying such a technique enables a desired track to be quickly and intuitively selected and played. Note that since the user does not perform any special operations during selection, the operation steps are not increased over those shown in the example illustrated in FIG. 8.

(Method for Selecting a Track Utilizing a Plurality of Icon Displays (FIGS. 12 and 13))

In the example illustrated in FIG. 11, a method for displaying an icon representing a plurality of tracks in a window was illustrated. However, since there are environments that can display a virtual object V_OBJ, as illustrated in FIG. 12, a virtual object V_OBJ representing a plurality of tracks could be displayed on the side of the CD, which is a real object R_OBJ. For example, a virtual object V_OBJ representing individual tracks #1 to #4 could be displayed on the four corners of a CD case.

In this case, as illustrated in FIG. 13, a desired track can be played by the user performing an operation to bring the virtual object V_OBJ representing a desired track close to the window. As described above, the virtual object V_OBJ can be displayed so as to follow the position and orientation of an real object R_OBJ. Therefore, in a configuration like that in FIG. 13, if the user rotates the CD case, it is desirable that the virtual object V_OBJ is displayed so as to follow the movement of the four corners of the CD case.

Applying such a configuration enables the user to easily play a desired track by adjusting the direction of the real object R_OBJ and bringing it close to the window. Consequently, the user can quickly and intuitively select and play a desired track. Note that, similar to the example in FIG. 11, since the user does not perform any special operations during selection, the operation steps are not increased over those shown in the example illustrated in FIG. 8.

2-5: Applied Examples

In the above, examples were described of a user interface for playing a song on a CD. However, the applied scope of the technology according to the present embodiment is not limited to this. For example, the following operation modes and modified examples, which could be conceived of by considering the technical common knowledge during implementation based on such operation modes, are naturally also included in the application scope of the technology according to the present embodiment.

(Application in a Book Reader (FIG. 14))

FIG. 14 is an explanatory diagram illustrating an applied example of the technology according to a book embodiment. An applied example in a book reader will now be described with reference to FIG. 14. In this case, a user wishing to issue a predetermined command relating to a book brings a book, which is a real object, close to an application window in a book reader, for example, so that the book and the application window are in a predetermined positional relationship.

The application window in the book reader may be a display object displayed on a display device, or may be a virtual object displayed on an HMD.

The user holds the book so that the camera CA can capture an image of the front cover, for example. In this case, the object identification unit 122 matches a database for a plurality of books in which information about an image of the front cover or a characteristic point extracted in advance from the image is recorded with the captured image of the book front cover. The book most similar to the captured book among the books recorded in the database is identified as the book whose image was captured.

If the captured book and the application windows are in a predetermined positional relationship, the positional relationship analysis unit 105 detects that positional relationship, and the command issuance unit 106 issues a predetermined command. In the case of a book reader, the command issuance unit 106 issues a command for reading aloud the content of the book brought close to the application window, or displaying the text on a screen.

Further, the command issuance unit 106 may issue a command for acquiring from a server digital data relating to a book that has come close to the application window. Examples of digital data relating to the book include text data of that book, publication information about that book, a list of books from the same author, a list of recommended books based on that book and the like.

In addition, the system may also be configured by pre-recording an image of a page corresponding to each section of the book in a database, so that the user brings the book close to the application window while opening the page corresponding to a desired section.

For example, an image of the first page of each chapter in the book is pre-recorded in a database. When the user brings the book close to the application window with the first page of the chapter of the book that he/she wants to be read open, the reading starts from that chapter.

In the above, an applied example of the technology according to the present embodiment was described with reference to FIG. 16.

Other Applied Examples (FIGS. 15 to 17)

In the above, we mainly described a case in which the real object serving as the operation target (hereinafter, "operation target object") was a CD. If the operation target object is a CD, the control target content is the songs included in the CD, the output destination is an AR music player, and the command issued by the command issuance unit 106 is a command for playing a song included in the CD.

FIG. 15 is an explanatory diagram illustrating an applied example of the technology according to the present embodiment. FIG. 15 illustrates a list associating the operation target object, control target content, output destination, and command for a case in which the operation target object is something other than the above-described CD.

As illustrated in FIG. 15, a video included on a DVD is played when the user maneuvers the DVD so that the DVD and a media player are in a predetermined positional relationship.

A photograph contained in a digital camera is displayed when the user maneuvers the digital camera so that the digital camera and a digital photo frame are in a predetermined positional relationship.

A passage included in a book is recited when the user maneuvers the book so that the book and a speech program are in a predetermined positional relationship.

A passage included in a book is copy-and-pasted into a text editor when the user maneuvers the book so that the book and the text editor are in a predetermined positional relationship.

A photograph included in a book is copy-and-pasted into image editing software when the user maneuvers the book so that the book and the image editing software are in a predetermined positional relationship.

Contact information included on a business card is recorded when the user maneuvers the business card so that the business card and a mobile phone or an information terminal are in a predetermined positional relationship.

Further, if the user maneuvers a food item so that the food item and an avatar in a virtual space are in a predetermined positional relationship, and if that food item is liked by the avatar, a gesture indicating that the avatar will eat the food item is displayed. Note that among the control target content in FIG. 15, "preferred food" means information that the avatar likes that food item.

If a plurality of content is included in one operation target object, the three-dimensional information analysis unit 102 or the virtual object management unit 103 analyzes or manages information corresponding to each of a plurality of players.

Further, the positional relationship analysis unit 105 analyzes the positional relationship between the operation target object and each of the plurality of players. If the operation target object and any one of the players are in a predetermined positional relationship, the positional relationship analysis unit 105 outputs a signal corresponding to that player, and the command issuance unit 106 issues a command corresponding to that player.

For example, if a DVD including songs and videos is brought near an AR music player, the command issuance unit 106 issues a command to play a song. Further, if that DVD is brought near a media player, the command issuance unit 106 issues a command to play a video.

In the past, when issuing a desired command corresponding to an object including a plurality of content, the user needed to operate a GUI and the like in order to select the command to be issued. However, according to the above-described method, the user can perform an intuitive operation without having to master a GUI operation method, for example, in advance.

Note that, unless noted otherwise, in FIG. 17 the output destination object may be a real object, a display object, or a virtual object.

A case in which the operation target object is a food item will now be described in more detail with reference to FIGS. 16 and 17.

FIG. 16 is an explanatory diagram illustrating an example in which the user brings a preferred food of an avatar that is in a virtual space close. FIG. 17 is an explanatory diagram illustrating an example in which the user brings something other than a preferred food of an avatar in a virtual space close.

As illustrated in FIG. 16, for example, when the user brings a strawberry, which is a preferred food, as a real object R_OBJ close to an avatar in a virtual space, first, the fact that the real object captured by the imaging unit 101 is a strawberry is analyzed by the three-dimensional information analysis unit 102. Further, the virtual object acquisition unit 131 acquires the fact that "strawberries are a preferred food of the avatar" as information associated with the strawberry, which is a real object.

The display unit 104 displays a strawberry as a pre-stored virtual object V_OBJ, and displays a gesture indicating that the avatar will eat the displayed strawberry.

On the other hand, as illustrated in FIG. 17, when the user brings an apple, which is not a preferred food, as a real object R_OBJ close to an avatar in a virtual space, first, the fact that the real object captured by the imaging unit 101 is an apple is analyzed by the three-dimensional information analysis unit 102. Further, the virtual object acquisition unit 131 acquires the fact that "apples are not a preferred food of the avatar" as information associated with the apple, which is a real object.

The display unit 104 displays an apple as a pre-stored virtual object V_OBJ, and displays a gesture indicating that the avatar does not like to eat the displayed apple.

Further, the virtual object acquisition unit 131 may be configured so to not acquire a virtual object if the real object included in the acquired image is not included in a database pre-recorded with information about only the preferred foods of the avatar (if that real object is not a preferred food of the avatar). In this case, the display of the display unit 104 does not change even if the real object is brought close, so that as viewed by the user, the avatar does not appear to react.

Thus, the present technology can be applied to provide games that are even more real by, for example, allowing the user to communicate by giving food to an avatar in a virtual space via a food item, which is a real object.

3: Second Embodiment (Operation Interface that Considers Gestures)

Next, a second embodiment according to the present technology will be described. The second embodiment relates to a technique for realizing a more complex operation by combining the configuration of the first embodiment with gestures that utilize a real object.

3-1: System Configuration Example

First, a configuration example of a system capable of realizing the technology according to the second embodiment will be described. This system is configured from, for example, an imaging unit 101, an information processing apparatus 100, a display unit 104, an output control apparatus 200, and an output device 210. However, the information processing apparatus 100 may be integrally formed with the imaging unit 101 and the display unit 104. Further, the output device 210 may be an audio output device that outputs audio, or a display device that displays an image. In addition, some or all of the functions of the information processing apparatus 100 may be realized by a cloud computing system. In the following, the description will focus on the configuration of the information processing apparatus 100.

3-2: Configuration of Information Processing Apparatus 100 (FIG. 18)

The configuration of the information processing apparatus 100 according to the second embodiment will be described with reference to FIG. 18. FIG. 18 is an explanatory diagram illustrating a function configuration of the information processing apparatus 100. As illustrated in FIG. 18, the information processing apparatus 100 mainly includes an imaging unit 101, a three-dimensional information analysis unit 102, a virtual object management unit 103, a display unit 104, a positional relationship analysis unit 105, a command issuance unit 106, and a communication unit 107.

The imaging unit 101 includes, for example, a lens for collecting light incident from a real object and an image sensor for generating an electric signal based on the amount of received light. The imaging unit 101, which captures an image of a real object, may be, for example, the camera CA provided on the HMD worn by the user.

Examples of image sensors that can be utilized include a CCD image sensor and a CMOS image sensor. The imaging unit 101 captures an images of a real object, and outputs the captured image to the three-dimensional information analysis unit 102 and the display unit 104.

The three-dimensional information analysis unit 102 analyzes three-dimensional information included in the captured image input from the imaging unit 101. The three-dimensional information analysis unit 102 includes a position/orientation detection unit 121, an object identification unit 122, and a movement recognition unit 123.

The position/orientation detection unit 121 in the three-dimensional information analysis unit 102 analyzes the captured image of the input real object, and detects the position and orientation in three-dimensional space of the real object. The detection method may be carried out using the above-described SURF technology, for example. The position/orientation detection unit 121 outputs the position and the orientation of the detected real object to the virtual object management unit 103.

The object identification unit 122 in the three-dimensional information analysis unit 102 analyzes the captured image of the input real object, and identifies an ID of the real object.

The object identification unit 122 detects, for example, the position of one or a plurality of characteristic points from the captured image of the input real object. Further, the object identification unit 122 matches the position of a characteristic point of the input real object with the position of a characteristic point of a plurality of real objects that is stored in a (not illustrated) storage unit, such as a memory.

This storage unit stores, for each of a plurality of real objects, an ID of these real objects and the position of each characteristic point. The object identification unit 122 sets the ID of the real object having the characteristic point whose distance from the characteristic point of the input real object is the shortest from among the plurality of real objects for which characteristics points are stored in the storage unit as the ID for the input real object. The characteristic point is, for example, a point located on the circumference of a polygonal square or circle. The object identification unit 122 outputs the identified real object ID to the virtual object management unit 103.

Further, the movement recognition unit 123 recognizes movement of the real object by monitoring the position of the real object detected by the position/orientation detection unit 121. For example, if the real object has been moved along a given trajectory, the movement recognition unit 123 determines whether that trajectory corresponds to a predetermined pattern. If it is determined that the trajectory of the real object corresponds to a predetermined pattern, the movement recognition unit 123 recognizes that there has been a gesture, and thus inputs information indicating that predetermined pattern (hereinafter, "gesture information") into the virtual object management unit 103, or into the command issuance unit 106 via the positional relationship analysis unit 105.

The above-described gesture information is utilized in, for example, display control of a virtual object based on the type of gesture and in the selection of a command. For example, if a gesture of throwing a real object is recognized, display control is performed so that an icon (a virtual object) superimposed over the real object jumps. Further, if a gesture of shaking a real object left and right is recognized, the display of a display object or a virtual object is switched, or a predetermined command such as stopping content playback is selected.

The virtual object management unit 103 acquires the virtual object corresponding to the real object and controls the position where this virtual object will be superimposed based on the ID and the position of the identified real object. For example, the display control of the virtual object based on the gesture is realized by utilizing the function of the virtual object management unit 103. Further, the virtual object management unit 103 includes a virtual object acquisition unit 131 and a superimposition position control unit 132.

The virtual object acquisition unit 131 acquires display information about the virtual object corresponding to the ID of the identified real object from a database, for example, pre-stored in a memory or other such storage unit. For example, if the input real object is identified as a CD, as the corresponding virtual object, an icon having the shape of a musical note may be acquired from the database. The virtual object acquisition unit 131 outputs the acquired virtual object display information to the display unit 104 and the positional relationship analysis unit 105.

The superimposition position control unit 132 controls the position where the virtual object acquired by the virtual object acquisition unit 131 will be superimposed based on the position and the orientation of the detected real object. For example, the superimposition position control unit 132 calculates the position of the center of the CD, which is the detected real object, and superimposes the virtual object over the calculated position. The superimposition position control unit 132 outputs the position where the virtual object is to be superimposed to the display unit 104 and the positional relationship analysis unit 105.

The display unit 104 superimposes the virtual object input from the virtual object management unit 103 over the captured image that includes the real object.

The capturing of an image of the real object by the imaging unit 101, the three-dimensional information analysis of the captured image by the three-dimensional information analysis unit 102, and the acquisition and position control of the virtual object by the virtual object management unit 103 are performed in real time. Consequently, if the user moves the real object, the virtual object corresponding to that real object also moves so as to follow the real object.

The positional relationship analysis unit 105 analyzes the positional relationship between a given real object included in an image captured by the imaging unit 101 (hereinafter, "real object A") and a predetermined object other than object A (hereinafter, "object B"). We will now consider an example in which object A is a CD, and object B is an application window for CD playback.

Object B, which here is an application window for CD playback for example, may be a display object displayed on an external display device or a virtual object displayed on the display unit 104, such as an HMD. However, in this example the position of object B does not follow the position of object A.

If object B is a display object such as an application window displayed by an external display device, the real object A and object B are included in the image captured by the imaging unit 101. This captured image is analyzed by the three-dimensional information analysis unit 102, whereby the position and orientation of the real object A and the position and orientation of the display object B are detected. The positional relationship analysis unit 105 analyzes the positional relationship between the real object A and the display object B that were analyzed by the three-dimensional information analysis unit 102.

On the other hand, if object B is a virtual object such as a virtual application window, for example, the superimposition position control unit 132 controls the position and orientation of object B without any regard to the position and orientation of real object A captured by the imaging unit 101. The superimposition position control unit 132 may also control the position and orientation of object B based on the initial position and orientation of the real object A captured by the imaging unit 101.

If object B is a virtual object, the positional relationship analysis unit 105 analyzes the positional relationship between the real object A analyzed by the three-dimensional information analysis unit 102 and the virtual object B controlled by the virtual object management unit 103.

The positional relationship analysis unit 105 outputs a signal regarding whether real object A and object B are in a predetermined positional relationship, such as being close, to the command issuance unit 106.

More specifically, the positional relationship analysis unit 105 calculates the distance in three-dimensional space between real object A and object B. If the calculated distance is equal to or less than a predetermined threshold, the positional relationship analysis unit 105 determines that real object A and object B are close, and outputs a predetermined electric signal to the command issuance unit 106. Further, the calculation of the distance between real object A and object B may be carried out by considering only the distance in a predetermined direction.

However, when calculating the distance in three-dimensional space between real object A and object B, if object B is a display object, coordinates based on the display plane of the display device have to be converted into three-dimensional space coordinates. For example, for coordinates based on the display plane of the display device, one corner of the display screen in the display device serves as the origin. Further, one side of the two sides forming this corner is taken as the x axis, and the other side as the y axis.

If a signal indicating that real object A and object B are in a predetermined positional relationship is input from the positional relationship analysis unit 105, the command issuance unit 106 issues a predetermined command relating to real object A. Further, this predetermined command may relate to real object A and also relate to object B. In addition, the predetermined command may be pre-associated with a combination of the real object A, object B, and recognized gesture.

For example, if the real object A is a CD, when this CD is brought near the application window for CD playback (object B), the command issuance unit 106 issues a command to perform CD playback. Further, if the CD is shaken to the left and right, the command issuance unit 106 issues a command to, for example, change the track or increase/decrease the volume.

Here, the information processing apparatus 100 is connected to the output control apparatus 200 via a wired or wireless network. The issued command is transmitted to the output control apparatus 200 via the communication unit 107. The output control apparatus 200 controls the output device 210 by executing the received command. The output device 210 may be an audio playback device, a video playback device and the like.

The output control apparatus 200 may be a part of the information processing apparatus 100. In this case, the communication unit 107 is removed from the configuration of the information processing apparatus 100 illustrated in FIG. 18, so that commands are directly transmitted to the output control apparatus 200 from the command issuance unit 106.

In the above, we mainly described the configuration of the information processing apparatus 100.

3-3: Operation of Information Processing Apparatus 100 (FIG. 19)

Next, operation of the information processing apparatus 100 according to the second embodiment will be described with reference to FIG. 19. FIG. 19 is a flowchart illustrating operation of the information processing apparatus 100 according to the second embodiment.

As illustrated in FIG. 19, first, the information processing apparatus 100 detects a real object from a captured image (S111). At this stage, the information processing apparatus 100 detects the position and orientation of the real object. Then, the information processing apparatus 100 recognizes the type of the real object from the captured image (S112). Next, the information processing apparatus 100 acquires a predetermined virtual object to be displayed in a virtual space based on the type, position etc. of the real object (S113). For example, if the real object is a CD case, the information processing apparatus 100 acquires a music player screen or an icon marked by a musical note as the virtual object.

Next, the information processing apparatus 100 displays and superimposes the virtual object acquired in step S113 (S114). For example, the information processing apparatus 100 displays the music player screen in a virtual space, or superimposes an icon marked by a musical note over the CD case. Then, the information processing apparatus 100 controls the display position of the virtual object based on the position and orientation of the real object (S115). For example, if the user has brought the CD case close to the music player screen, the information processing apparatus 100 moves the icon superimposed over the CD case so as to follow the movement of the CD case.

Further, the information processing apparatus 100 monitors the movement of the real object, and if a trajectory formed by the movement of the real object forms a predetermined pattern, determines that there has been a gesture, and executes display control based on that gesture (S116). For example, if its is determined that there has been a gesture when the real object was shaken to the left and right (made a predetermined gesture), the information processing apparatus 100 executes processing to switch the type of virtual object. Note that specific gesture examples and specific display control methods will be described below.

Next, the information processing apparatus 100 detects the positional relationship between the real object and a predetermined object (e.g., a music player screen etc., or a window) (S117). Then, the information processing apparatus 100 determines whether the positional relationship detected in step S117 satisfies the predetermined positional relationship (S118). For example, the information processing apparatus 100 determines whether the real object and the predetermined object are in contact, or determines whether the distance between the real object and the predetermined object is equal to or less than a predetermined distance.

If the real object and the predetermined object are in a predetermined positional relationship, the processing proceeds to step S119. On the other hand, if the real object and the predetermined object are not in a predetermined positional relationship, the processing returns to step S115. If the processing has proceeded to step S119, the information processing apparatus 100 issues a pre-set command based on the type of the real object, the type of the predetermined object, or the positional relationship (S119), and then ends the series of processes relating to command issuance processing. Specific examples of the respective objects, specific examples of the commands, and the specific operation method will be described below.

In the above, operation of the information processing apparatus 100 according to the second embodiment was described. Although the flow of processing considering gestures that is executed when issuing a command based on a positional relationship was described, optionally, some of the processing steps may be interchanged or modified. Further, the respective operation methods described below that apply the processing flow described here can configure an executable user interface.

3-4: Regarding the Operation Method

Next, an example of a user interface and an operation method thereof that can be executed using the functions of the information processing apparatus 100 according to the second embodiment will be described with reference to FIGS. 20 and 21.

(Switching Operation of the Selection Screen Based on a Gesture (FIG. 20))

A more complex operation is possible by combining with a gesture. Examples of such a more complex operation include, as illustrated in FIG. 20, an operation that switches the display of an icon corresponding to a plurality of tracks displayed in a window based on a gesture. For example, a track selection screen can be switched based on an operation of shaking or rotating the CD case, which is the real object R_OBJ, left and right. More specifically, one possible method is to control the display so that an icon array is scrolled in a right direction when the real object R_OBJ is shaken or rotated to the right.

Other effective methods may include a method in which tracks are scrolled one by one by a rotation operation, and a method in which a plurality of tracks displayed in a window change all at once based on a shaking up and down operation. In the example illustrated in FIG. 20, when the CD case is rotated to the right, the display of tracks #1 to #3 switches all at once to tracks #2 to #4, for example, and when the CD case is shaken in a vertical direction, the display of tracks #1 to #3 switches all at once to tracks #4 to #6.

Applying this method is highly convenient, since this enables the track selection screen to be switched without the real object R_OBJ leaving the user's hand. Further, the number of operation steps is low, and an intuitive user interface is realized. Obviously, this method can be combined with all of the technologies according to the above-described first embodiment and the technologies according to the second embodiment described up to this point.

(Icon Throwing Operation Based on a Gesture (FIG. 21))

Although an operation that switches a track selection screen based on a gesture was described with reference to FIG. 20, in this example we will propose a method for controlling the movement of a virtual object V_OBJ accompanying a real object R_OBJ based on a gesture. For example, as illustrated in FIG. 21, when a gesture of tossing a real object R_OBJ is made, a virtual object V_OBJ displayed accompanying the real object R_OBJ can be made to jump up. Applying this method enables a song on a CD to be played even if the CD is not brought close to the CD player when the CD is far away from the CD player.

Further, since the virtual object V_OBJ actually appears to jump, this method can be used in gaming to stimulate a user's sense of fun. Applying this method is highly convenient, since this enables a song to be played just with a slight operation. Further, the number of operation steps is low, and an intuitive user interface is realized. Obviously, this method can be freely combined with all of the technologies according to the above-described first embodiment and the technologies according to the second embodiment described up to this point.

In the above, an example of a user interface and an operation method thereof that can be executed using the functions of the information processing apparatus 100 according to the second embodiment was described.

4: Hardware Configuration Example (FIG. 22)

The function of each constituent element of the above-described information processing apparatus 100 can be realized by, for example, using the hardware configuration of the information processing apparatus illustrated in FIG. 22. Specifically, the function of each constituent element is realized by controlling the hardware illustrated in FIG. 22 using a computer program. Note that the mode of this hardware is arbitrary. Examples thereof may include a personal computer, a mobile phone, a PHS, a portable information terminal such as a PDA, a game machine, or various information home appliances. Here, PHS is an abbreviation for personal handy-phone, and PDA is an abbreviation for personal data assistant.

As illustrated in FIG. 22, this hardware (which is example processing circuitry) mainly includes a CPU 902, a ROM 904, a RAM 906, a host bus 908, a bridge 910, an external bus 912, an interface 914, an input unit 916, an output unit 918, a storage unit 920, a drive 922, a correction port 924, and a communication unit 926. Here, CPU is an abbreviation for central processing unit, ROM is an abbreviation for read-only memory, and RAM is an abbreviation for random access memory.

The CPU 902 functions as a calculation processing apparatus or a control apparatus, and controls all or a part of the operations of the respective constituent elements based on various programs stored in the ROM 904, the RAM 906, the storage unit 920, or a removable storage medium 928. The ROM 904 is a device for storing, for example, programs to be read into the CPU 902 and data to be used for calculations. The RAM 908 temporarily or permanently stores, for example, programs to be read into the CPU 902 and various parameters that appropriately change when those programs are executed.

These constituent elements are interconnected via, for example, the host bus 908 that is capable of high-speed data transmission. On the other hand, the host bus 908 is connected to, for example, the external bus 912, which has a comparatively low data transmission speed, via the bridge 910. Further, used as the input unit 916 is, for example, a mouse, a keyboard, a touch panel, a button, a switch, a lever and the like. Further, a remote controller (hereinafter, "remote control") capable of transmitting a control signal utilizing infrared rays or other electromagnetic waves can also be used as the input unit 916.

Examples of the output unit 918 include an apparatus capable of visually or aurally notifying a user of acquired information, for instance a display such as a CRT, a LCD, a PDP, or an ELD, an audio output device such as a speaker or headphones, a printer, a mobile phone, a facsimile or the like. Here, CRT is an abbreviation for cathode ray tube, LCD is an abbreviation for liquid crystal display, PDP is an abbreviation for plasma display panel, and ELD is an abbreviation for electro-luminescence display.

The storage unit 920 is a device for storing various data. Examples of devices that can be used as the storage unit 920 include a magnetic storage device such as a HDD, a semiconductor storage device, an optical storage device, a magneto-optical storage device or the like. Here, HDD is an abbreviation for hard disk drive.

The drive 922 is an apparatus for reading information recorded on the removable storage medium 928, such as a magnetic disk, an optical disc, a magneto-optical disk, or a semiconductor memory, or writing information on the removable storage medium 928. The removable storage medium 928 may also be DVD media, Blu-ray media, HD-DVD media, various semiconductor storage media and the like. Obviously, the removable storage medium 928 may be a IC card having a non-contact IC chip, an electronic device or the like. Here, IC is an abbreviation for integrated circuit.

The correction port 924 is, for example, a USB port, an IEEE 1394 port, a SCSI, an RS-232C port, or an optical audio terminal, for connecting to an external correction device 930. The external correction device 930 is, for example, a printer, a portable music player, a digital camera, a digital video camera, an IC recorder or the like. Here, USB is an abbreviation for universal serial bus and SCSI is an abbreviation for small computer system interface.

The communication unit 926 is a communication device for connecting to a network 932. Examples thereof may include a wired or wireless LAN, Bluetooth (Trade Mark) a communication card for WUSB, an optical communication router, an ADSL router, various communication modems or the like. The network 932 connected to the communication unit 926 is configured from a wired or wirelessly connected network, such as the Internet, a home LAN, infrared ray communication, visible light communication, broadcasting, satellite communication or the like. Here, LAN is an abbreviation for local area network, WUSB is an abbreviation for wireless USB, and ADSL is an abbreviation for asymmetric digital subscriber line.

5: Summary

Finally, we shall summarize the technical concept of the present embodiments. The below-described technical concept can be applied in, for example, various information processing apparatuses, such as a PC, a mobile phone, a portable game machine, a portable information terminal, a home appliance, and a car navigation system. For example, since the information processing apparatus described in the following (1) issues commands based on a positional relationship among objects, this information processing apparatus can be intuitively operated when issuing a command. Further, since a virtual object relating to the issued command is superimposed over a first or a second object, the content of the processing that will probably be subsequently executed can be known in advance, which allows operations to be carried out with a sense of reassurance.

Additionally, the present technology may also be configured as below.

An information processing apparatus that includes processing circuitry configured to issue a control command relating to a real object based on a displayed positional relationship between the real object and a predetermined object, wherein the real object being a tangible, movable object and the predetermined object being at least one of another real object and a virtual object.

According to one aspect of the information processing apparatus, the tangible, movable object being a portable object.

According to another aspect the virtual object being an object added to a reference scene so that the reference scene and the virtual object being displayed as an augmented reality scene.

According to another aspect in response to an external input, the control command causes the processing circuitry to bring the real object to the virtual object in the augmented reality scene.

According to another aspect the virtual object includes an application window, and when the real object is at least partially included in the application window in the augmented reality scene, a content of the real object is executed by an application associated with the application window.

According to another aspect the predetermined object is another real object, and in response to the real object being detected as approaching the another real object, the control command causes the processing circuitry to move an icon associated with the real object to the another real object displayed in the augmented reality scene.

According to another aspect an application associated with the another real object is executed using content from the real object when the icon is moved to the another real object in the augmented reality scene.

According to another aspect the predetermined object is another real object, and in response to the real object being detected as approaching the another real object within a predetermined distance, the control command causes the processing circuitry to jump an icon associated with the real object to the another real object in the augmented reality scene.

According to another aspect the predetermined object is another real object that displays a display object, and in response to the real object being detected as approaching the display object, the control command causes the processing circuitry to execute an application associated with the display object using content of the real object.

According to another aspect the content is displayed a plurality of parts in the augmented reality scene and in response to the real object being detected as approaching one of the plurality of parts, the control command causes the processing circuitry to execute the application using the one of the plurality of parts.

According to another aspect the plurality of parts include at least one of a video track and an audio track.

According to another aspect the content is displayed in the augmented reality scene as a plurality of parts associated with the real object and in response to one of the plurality of parts being detected as approaching the application window, the control command causes the processing circuitry to execute the application using the one of the plurality of parts.

According to another aspect the plurality of parts includes at least one of a video track and an audio track.

According to another aspect the real object being a book, and the predetermined object being a book reader application.

According to another aspect the real object being of a CD, DVD, digital camera, book, business card and a food item.

According to another aspect the real object being an item, and the augmented reality scene includes an avatar that exhibits a gesture corresponding to whether the item is a preferred item of the avatar.

According to another aspect in response to a gesture made with the real object, the processing circuitry causes the control command to switch the predetermined object from a first virtual reality object to a second virtual reality object.

According to another aspect in response to detection of a gesture of throwing the real object, the control command causes the processing circuitry to jump an icon associated with the real object to the another real object in the augmented reality scene.

According to an information processing method embodiment, the embodiment includes issuing a control command from processing circuitry, the control command relating to a real object based on a displayed positional relationship between the real object and a predetermined object, wherein the real object being a tangible, movable object and the predetermined object being at least one of another real object and a virtual object.

According to another information processing apparatus embodiment, the apparatus includes an interface that receives information regarding a movement of a real object; and processing circuitry configured to issue a control command relating to the movement of the real object based on a displayed positional relationship between the real object and a predetermined object, wherein the real object being a tangible, movable object and the predetermined object being at least one of another real object and a virtual object.

According to another information processing apparatus embodiment, the apparatus includes a command issuance unit configured to, when a first object viewed by a user and a second object whose position can be moved by the user are in a predetermined positional relationship, issue a predetermined command associated with the second object; and a display control unit configured to superimpose a virtual object relating to the predetermined command over the first or the second object.

According to one aspect of the information processing apparatus,
a command transmission unit configured to transmit a predetermined command issued by the command issuance unit to a device capable of executing the predetermined command.
According to another aspect
the command issuance unit is configured to execute a predetermined command that is associated with the second object and also with the first object.
According to another aspect
a position determination unit configured to, when a plurality of the virtual objects are superimposed over the second object, determine a display position of each virtual object based on a position and shape of the second object,
wherein the display control unit is configured to display each virtual object at the display position determined by the position determination unit.
According to another aspect
the display control unit is configured to display a first virtual object when the first object and the second object are not in the predetermined positional relationship, and display a second virtual object different to the first virtual object when the first object and the second object are in the predetermined positional relationship.
According to another aspect
the command issuance unit is configured to, when a distance between the first object and the second object is equal to or less than a predetermined threshold, determine that the predetermined positional relationship is satisfied and issue the predetermined command.
According to another aspect
the command issuance unit is configured to issue the predetermined command when a movement pattern of the second object forms a predetermined trajectory.
According to another aspect
the command issuance unit is configured to issue a predetermined command based on a type of the trajectory.
According to another aspect
the command issuance unit is configured to issue the predetermined command when the second object satisfies the predetermined positional relationship with respect to the first object, and a movement pattern of the second object forms a predetermined trajectory.
According to another aspect
the command issuance unit is configured to, when a plurality of the predetermined commands are associated with the second object, and the plurality of virtual objects are superimposed over the first object, select the predetermined command to be issued based on the positional relationship between the second object and each of the virtual objects.
According to another aspect
the command issuance unit is configured to, when a plurality of the predetermined commands are associated with the second object, and the plurality of virtual objects are superimposed over the second object, select the predetermined command to be issued based on the positional relationship between the first object and each of the virtual objects.
According to another aspect
the command issuance unit is configured to issue the predetermined command corresponding to the predetermined trajectory when the plurality of predetermined commands are associated with the second object, and the second object forms a predetermined trajectory.
According to another aspect
the first object is an object in a virtual space.

According to another aspect
the position of the first object can be moved by the user.
According to another aspect
the display control unit is configured to display the virtual object by controlling a head-mounted device that can be worn by the user on a head portion and has a display unit that enables the user to see display information.
According to another aspect
the head-mounted device further comprises an imaging unit or a sensor, and a position of the second object is detected based on an image of the second object captured by the imaging unit or a detection result of the second object detected by the sensor.
According to an information processing method embodiment, the embodiment includes when a first object viewed by a user and a second object whose position can be moved by the user are in a predetermined positional relationship, issuing a predetermined command associated with the second object command; and
superimposing a virtual object relating to the predetermined command over the first or the second object.

(Note)

The above-described positional relationship analysis unit 105 and command issuance unit 106 are an example of a command issuance unit. The above-described virtual object management unit 103 is an example of a display control unit and a position determination unit. The above-described communication unit 107 is an example of a command transmission unit. The above-described HMD is an example of a head-mounted device.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

100 Information processing apparatus
101 Imaging unit
102 Three-dimensional information analysis unit
103 Virtual object management unit
104 Display unit
105 Positional relationship analysis unit
106 Command issuance unit
107 Communication unit
121 Position/orientation detection unit
122 Object identification unit
123 Movement recognition unit
131 Virtual object acquisition unit
132 Superimposition position control unit
200 Output control apparatus
210 Output device

The invention claimed is:

1. An information processing apparatus, comprising:
processing circuitry configured to:
    detect a first real object from a captured image;
    determine a first position of a first characteristic point of the first real object, an orientation of the first real object, and a type of the first real object;
    compare the first position, of the first characteristic point of the first real object, with each of a plurality of second positions of a corresponding second characteristic point of a plurality of second characteristic points,
        wherein each of the plurality of second characteristic points is associated with a respective second real object of a plurality of second real objects, and wherein the plurality of second characteristic points of the plurality of second real objects is stored in a memory;
determine a shortest distance among a plurality of first distances,
wherein each of the plurality of first distances is between the first position of the first characteristic point and a respective one of the plurality of second positions;
set an identification label of the first real object based on the determined shortest distance, wherein the identification label identifies the first real object;
determine a virtual object corresponding to the captured image based on:
the first position,
the identification label of the first real object,
the orientation of the first real object, and
the type of the first real object;
control a display device to display the virtual object and the captured image such that the virtual object is superimposed on the captured image; and
generate a control command, for execution of an operation associated with the first real object, based on a physical movement of the first real object towards a particular object such that the first real object is at a threshold distance from the particular object,
wherein the threshold distance is greater than zero.

2. The information processing apparatus of claim 1, wherein the first real object is a portable object.

3. The information processing apparatus of claim 1, wherein the processing circuitry is further configured to control the display device to display the virtual object and the captured image such that the captured image and the virtual object are displayed as an augmented reality scene.

4. The information processing apparatus of claim 3,
wherein the virtual object comprises an application window, and
wherein execution of reproduction of content of the first real object by an application associated with the application window is based on the first real object that is at least partially included in the application window in the augmented reality scene.

5. The information processing apparatus of claim 4, wherein the processing circuitry is further configured to:
control the display device to display the content as a plurality of parts in the augmented reality scene;
detect a positional relationship between the first real object and a part of the plurality of parts; and
execute the application based on the part of the plurality of parts.

6. The information processing apparatus of claim 5, wherein each of the plurality of parts comprises at least one of a video track or an audio track.

7. The information processing apparatus of claim 4, wherein the processing circuitry is further configured to:
control the display device to display the content in the augmented reality scene as a plurality of parts associated with the first real object;
detect a part of the plurality of parts that approaches the application window; and
execute the application based on the part of the plurality of parts.

8. The information processing apparatus of claim 7, wherein each of the plurality of parts comprises at least one of a video track or an audio track.

9. The information processing apparatus of claim 3,
wherein the first real object is an item, and
wherein the augmented reality scene comprises an avatar configured to exhibit a gesture that indicates whether the item is a preferred item of the avatar.

10. The information processing apparatus of claim 3, wherein the processing circuitry is further configured to switch the particular object from a first virtual reality object to a second virtual reality object based on a gesture associated with the first real object.

11. The information processing apparatus of claim 1,
wherein the particular object is a third real object and the virtual object is an icon associated with the first real object, and
wherein the processing circuitry is further configured to:
control the display device to display the third real object in an augmented reality scene;
detect a second distance, between the first real object and the third real object, that is less than the threshold distance; and
control a movement of the icon towards the displayed third real object based on the detection of the second distance that is less than the threshold distance.

12. The information processing apparatus of claim 11, wherein execution of an application associated with the third real object is based on content associated with the first real object, and the movement of the icon towards the displayed third real object.

13. The information processing apparatus of claim 11, wherein the processing circuitry is further configured to control the icon to jump towards the displayed third real object, in the augmented reality scene, based on a detection of a throw gesture associated with the first real object.

14. The information processing apparatus of claim 1,
wherein the particular object is a third real object and the virtual object is an icon associated with the first real object, and
wherein the processing circuitry is further configured to:
control the display device to display the third real object in an augmented reality scene; and
control the icon to jump to the displayed third real object based on the first real object is at the threshold distance from the third real object.

15. The information processing apparatus of claim 1, wherein the processing circuitry is further configured to:
control the display device to display a display object corresponding to the particular object;
detect a second distance, between the first real object and the display object, that is less than the threshold distance; and
execute an application associated with the display object based on content of the first real object and the detection of the second distance that is less than the threshold distance.

16. The information processing apparatus of claim 1, wherein the first real object is a book, and the particular object is a book reader application.

17. The information processing apparatus of claim 1, wherein the first real object is one of a CD, DVD, digital camera, book, business card, or a food item.

18. The information processing apparatus of claim 1, wherein the first real object is a tangible object.

19. An information processing method, comprising:
in an information processing apparatus:
detecting, by processing circuitry, a first real object from a captured image;

determining, by the processing circuitry, a first position of a first characteristic point of the first real object, an orientation of the first real object, and a type of the first real object;

comparing, by the processing circuitry, the first position, of the first characteristic point of the first real object, with each of a plurality of second positions of a corresponding second characteristic point of a plurality of second characteristic points,
- wherein each of the plurality of second characteristic points is associated with a respective second real object of a plurality of second real objects, and
- wherein the plurality of second characteristic points of the plurality of second real objects is stored in a memory;

determining, by the processing circuitry, a shortest distance among a plurality of first distances,
- wherein each of the plurality of first distances is between the first position of the first characteristic point and a respective one of the plurality of second positions;

setting, by the processing circuitry, an identification label of the first real object based on the determined shortest distance, wherein the identification label identifies the first real object;

determining, by the processing circuitry, a virtual object corresponding to the captured image based on:
- the first position,
- the identification label of the first real object,
- the orientation of the first real object, and
- the type of the first real object;

controlling, by the processing circuitry, a display device to display the virtual object and the captured image such that the virtual object is superimposed on the captured image; and generating, by the processing circuitry, a control command, for execution of an operation associated with the first real object, based on a physical movement of the first real object towards a particular object such that the first real object is at a threshold distance from the particular object,
- wherein the threshold distance is greater than zero.

20. An information processing apparatus, comprising:
an interface configured to receive information related to movement of a first real object; and
processing circuitry configured to:
- detect the first real object from a captured image;
- determine a first position of a first characteristic point of the first real object, an orientation of the first real object, and a type of the first real object;
- compare the first position of the first characteristic point of the first real object, with each of a plurality of second positions of a corresponding second characteristic point of a plurality of second characteristic points,
  - wherein each of the plurality of second characteristic points is associated with a respective second real object of a plurality of second real objects, and
  - wherein the plurality of second characteristic points of the plurality of second real objects is stored in a memory;
- determine a shortest distance among a plurality of distances,
  - wherein each of the plurality of distances is between the first position of the first characteristic point and a respective one of the plurality of second positions;
- set an identification label of the first real object based on the determined shortest distance, wherein the identification label identifies the first real object;
- determine a virtual object corresponding to the captured image based on:
  - the first position,
  - the identification label of the first real object,
  - the orientation of the first real object, and
  - the type of the first real object;
- control a display device to display the virtual object and the captured image such that the virtual object is superimposed on the captured image; and
- generate a control command, for execution of an operation associated with the first real object, based on a physical movement of the first real object towards a particular object such that the first real object is at a threshold distance from the particular object,
  - wherein the threshold distance is greater than zero.

* * * * *